(12) United States Patent
Matsumoto et al.

(10) Patent No.: US 8,281,032 B2
(45) Date of Patent: Oct. 2, 2012

(54) IT RESOURCE EVALUATION SYSTEM, RECORDING MEDIUM STORING IT RESOURCE EVALUATION PROGRAM, AND MANAGEMENT SYSTEM

(75) Inventors: Yasuhide Matsumoto, Kawasaki (JP); Masatomo Yasaki, Kawasaki (JP); Masashi Uyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 921 days.

(21) Appl. No.: 11/236,638

(22) Filed: Sep. 28, 2005

(65) Prior Publication Data

US 2007/0005799 A1 Jan. 4, 2007

(30) Foreign Application Priority Data

Jun. 29, 2005 (JP) .................................. 2005-190615

(51) Int. Cl.
*G06F 15/173* (2006.01)
*G06F 17/00* (2006.01)

(52) U.S. Cl. ........ 709/238; 709/223; 709/224; 709/225; 709/226; 705/400

(58) Field of Classification Search .................. 709/223, 709/224, 225, 226, 238; 370/236.1, 236.2; 714/47; 705/400
See application file for complete search history.

(56) References Cited

U.S. PATENT DOCUMENTS

| | | | | |
|---|---|---|---|---|
| 5,737,581 | A | * | 4/1998 | Keane ................................ 703/6 |
| 6,151,582 | A | * | 11/2000 | Huang et al. ....................... 705/8 |
| 6,466,660 | B1 | * | 10/2002 | Merriam ........................ 379/126 |
| 7,200,589 | B1 | * | 4/2007 | Graupner ........................... 707/3 |
| 7,349,965 | B1 | * | 3/2008 | Graupner et al. ............. 709/226 |
| 2001/0049690 | A1 | * | 12/2001 | McConnell et al. ....... 707/104.1 |
| 2002/0032492 | A1 | * | 3/2002 | Sohner ............................. 700/95 |
| 2002/0059427 | A1 | * | 5/2002 | Tamaki et al. ................ 709/226 |
| 2002/0082856 | A1 | * | 6/2002 | Gray et al. ......................... 705/1 |
| 2003/0069972 | A1 | | 4/2003 | Yoshimura et al. |
| 2004/0015382 | A1 | * | 1/2004 | Baca et al. ......................... 705/8 |
| 2004/0024687 | A1 | * | 2/2004 | Delenda ............................ 705/37 |
| 2004/0111308 | A1 | * | 6/2004 | Yakov ................................ 705/8 |
| 2004/0249743 | A1 | * | 12/2004 | Virginas et al. ................. 705/37 |

(Continued)

FOREIGN PATENT DOCUMENTS

JP 2001-325041 A 11/2001
JP 2002-024192 1/2002

(Continued)

OTHER PUBLICATIONS

Japanese Office Action dated Mar. 17, 2009 (mailing date), issued in corresponding Japanese Patent Application No. 2005-190615.

(Continued)

*Primary Examiner* — Peter Shaw
(74) *Attorney, Agent, or Firm* — Westerman, Hattori, Daniels & Adrian, LLP

(57) ABSTRACT

An IT resource evaluation system connected to a management system for managing a plurality of IT resources working in a plurality of business systems, include a recording part for recording supply-and-demand data representing a transition of a demand or a supply of an IT resource in an entire business system, an accumulating part for accumulating actual dealing data containing a supply price, an IT resource data input part for inputting IT resource data regarding an IT resource to be evaluated, and an evaluating part for calculating value data representing a supply price in the case where an IT resource is supplied, based on supply-and-demand data, actual dealing data, and the IT resource data.

7 Claims, 19 Drawing Sheets

U.S. PATENT DOCUMENTS

| | | | |
|---|---|---|---|
| 2004/0260630 A1* | 12/2004 | Benco et al. | 705/30 |
| 2005/0102674 A1* | 5/2005 | Tameshige et al. | 718/100 |
| 2006/0224436 A1* | 10/2006 | Matsumoto et al. | 705/10 |
| 2007/0002747 A1* | 1/2007 | Matsumoto et al. | 370/236.1 |
| 2007/0002762 A1* | 1/2007 | Matsumoto et al. | 370/252 |

FOREIGN PATENT DOCUMENTS

| | | |
|---|---|---|
| JP | 2003-124976 | 4/2003 |

OTHER PUBLICATIONS

"Impending Limits of the Peak Measure: A Breakthrough is Capacity on Demand—Facing the Rapid Increase in Access with Minimum Cost", Yasahiro Kawai et al., Nikkei Internet Technology, Nikkei Business Publications Inc., Aug. 22, 2001, No. 50, pp. 46-49 with partial English translation.

"Innovations of Use of IT Rising GRID", Fujitsu Journal, Fujitsu Limited, Feb. 2004, vol. 30, No. 2, pp. 2-7 with partial translation.

"Fujitsu's Approach to the Business Grid Computing in 'TRIOLE'", Hideaki Tazaki, Computer & Network LAN, Ohmsha, Ltd., Aug. 1, 2004, vol. 22, No. 8, pp. 36-43 with partial translation.

"A Business Grid Computing Project Applying Grid Computing to Business Fields", Computer & Network LAN, Ohmsha, Ltd., Aug. 1, 2004, vol. 22, No. 8, pp. 18-25 with partial translation.

* cited by examiner

```xml
<?xml version="1.0" encoding="UTF-8"?>
<ITResources xmlns:xsi="http://www.w3.org/2001/XMLSchema-instance"
 xsi:noNamespaceSchemaLocation="http://idc.fujitsu.com/it_resource.xsd">

<ITResourceEvaluationItem profile_id="A Company">
    <SupplyConditionRuleItem id="1">
      <RefITResourceItem>
        <URI>uri://idc.fujitsu.com/Company_A/ITResource_1</URI>
        <OtherInfo/>
      </RefITResourceItem>                                              } D
      <PeriodType>
        <PeriodConditoin>
          <TimeItem>
            <TimeKey>Day</TimeKey>
            <TimeValue>0:00-7:00</TimeValue>
            <TimeEvaluator>uri://idc.fujitsu.com/TimeEvaluator</TimeEvaluator>
          </TimeItem>                                                   } E1
          <TimeItem>
            <TimeKey>Week</TimeKey>
            <TimeValue>!Satureday and !Sunday</TimeValue>
            <TimeEvaluator>uri://idc.fujitsu.com/TimeEvaluator</TimeEvaluator>
          </TimeItem>                                                   } E2
        </PeriodConditoin>
      </PeriodType>
      <ResourceType>
        <ResourceItem>
          <ResourceKey>CPU</ResourceKey>
          <ResourceValue><30%</ResourceValue>
            <ResourceEvaluator>uri://idc.fujitsu.com/ConditionEvaluator</ResourceEvaluator>
        </ResourceItem>                                                 } F
      </ResourceType>
    </SupplyConditionRule>
  </ITResourceEvalutaionItem>

</ITResources>
```

Determination rule #1

FIG. 10

IT RESOURCE EVALUATION SYSTEM, RECORDING MEDIUM STORING IT RESOURCE EVALUATION PROGRAM, AND MANAGEMENT SYSTEM

BACKGROUND OF THE INVENTION

1. Field of the Invention

The present invention relates to an IT (Information Technology) resource evaluation system for evaluating the value of each of a plurality of IT resources respectively working in a plurality of business systems operated independently from each other.

2. Description of Related Art

For example, in a facility such as an Internet data center (hereinafter, referred to as an IDC), an IT resource is working in each business system operated by a plurality of operating entities. The IDC takes care of an IT resource, such as a server, a storage, and a network, constituting each business system, and provides a connection line to the Internet, maintenance•operation service, and the like.

In particular, the IDC capable of increasing/decreasing an IT resource assigned to each business system in accordance with needs on demand is called an IDC of a utility system. In the management system for managing these IT resources, there is a demand that IT resources in a plurality of business systems are utilized efficiently.

For example, JP 2002-24192 A discloses a method for allowing a management server to automatically change an IT resource assigned for each operating entity in accordance with a load in the IDC. According to this method, a load distribution apparatus is used, which receives a processing request packet from a user of an IT resource, and distributing the processing requested from the user into a plurality of IT resources. In the load distribution apparatus, for each user using an IT resource, an assignment definition table representing an IT resource used by the user is set. The management server dynamically changes the assignment definition table, whereby the assignment of IT resources is changed automatically in accordance with a load.

SUMMARY OF THE INVENTION

However, in the above-mentioned conventional method, the management server merely changes the assignment of IT resources automatically, and IT resource flexibility among a plurality of business systems is not considered. More specifically, there is no mechanism for distributing the surplus of an IT resource in each business system among the business systems. Therefore, in the conventional IDC, the IT resources of all the business systems are not always used 100%, so that an IT resource to be a surplus is present. In order to utilize an IT resource to be a surplus efficiently, first, it is necessary to detect a surplus of an IT resource in each business system. Furthermore, it is necessary that an operating entity of a business system needs to make a determination for supplying a detected surplus to another business system.

As a determination standard in the case where an operating entity determines the supply of an IT resource, the information on a "value of an IT resource" at a time of supply, as well as the presence/absence of a surplus of an IT resource in its business system are required. The "value of an IT resource" is represented, for example, by an amount of money to be obtained in the case of supplying an IT resource to another business system. For example, it is very useful for an operating entity to obtain information "if a storage of 500 GB is supplied for 30 days in a period of October to November, an income of ¥1,000,000 can be obtained" as the information on the "value of an IT resource". However, conventionally, there is no mechanism for obtaining information on the value of an IT resource. Therefore, an operating entity of each business system does not know the value of an IT resource, so that it is difficult to supply a surplus IT resource efficiently in an appropriate period.

In order to solve the above-mentioned problem, the object of the present invention is to provide an IT resource evaluation system capable of providing information on the value of an IT resource, a management system connected to the IT resource evaluation system, an IT resource evaluation program, and a management program.

An IT resource evaluation system constituted with a computer of the present invention for evaluating a value of an IT resource with at least one of a plurality of business systems constituted with a computer operated independently from each other being targeted for evaluation is connected to a management system constituted with a computer having a mechanism of managing a plurality of IT resources working respectively in the plurality of business systems, and supplying a surplus of the IT resource in any one of the plurality of business systems among the plurality of business systems to another business system demanding the IT resource on a chargeable basis. The IT resource evaluation system includes: a supply-and-demand data recording part for recording supply-and-demand data representing a transition of at least either one of a demand and a supply of the IT resource in all the plurality of business systems; an actual dealing data recording part for recording actual dealing data containing at least an actual supply price, and an amount of a supplied IT resource, when the surplus of the IT resource in any one of the business systems is supplied actually to another business system; an IT resource data input part for inputting data regarding a suppliable IT resource in the business system targeted for evaluation, containing at least a suppliable amount of the IT resource and a suppliable period, from the business system targeted for evaluation; and an evaluating part for calculating value data representing a supply price in a case where the suppliable IT resource is supplied during the suppliable period represented by the IT resource data, based on the supply-and-demand data and the actual dealing data.

The evaluating part calculates the value data based on supply-and-demand data representing a transition of a demand or a supply of an IT resource in all the plurality of business systems. Therefore, a supply price during a suppliable period of an IT resource that can be supplied by a business system targeted for evaluation is calculated as a price considering the supply-and-demand balance in all the plurality of business systems. Furthermore, the evaluating part calculates value data based on actual dealing data containing at least an actual supply price of an actually supplied IT resource and an amount of the supplied IT resource. Therefore, a supply price based on the actual deal can be calculated as value data. Consequently, the evaluating part can calculate value data representing an appropriate market value of an IT resource to be supplied. Thus, the IT resource evaluation system can calculate and supply information regarding the value of an IT resource as objective data.

The management system constituted with a computer of the present invention is connected to the IT resource evaluation system of the present invention. The management system includes: a supply condition accumulating part for accumulating supply condition data for the business system having a surplus of an IT resource to supply the surplus, which represents at least an amount of the suppliable IT resource and a supply price; a demand condition accumulating part for accumulating demand condition data representing a demand condition for the business system that lacks an IT resource to compensate for a shortage of the IT resource; a matching part for extracting supply condition data and demand condition data that are matched with each other, from the supply condition data accumulated in the supply condition accumulating part and the demand condition data accumulated in the demand condition accumulating part; an assigning part for setting a suppliable IT resource represented by the supply condition data extracted by the matching part in a state workable by a business system related to the demand condition data extracted by the matching part; and an actual dealing data generating part for recording the supply condition data extracted by the matching part in the actual dealing data recording part of the IT resource evaluation system as the actual dealing data.

The matching part extracts a supply condition and a demand condition that are matched with each other from the supply condition accumulating part in which supply condition data is accumulated and the demand condition accumulating part in which demand condition data is accumulated. The assigning part sets an IT resource under the extracted supply condition in a workable state by a business system under the extracted demand condition. More specifically, the assigning part lends a surplus IT resource to a business system that lacks an IT resource. Consequently, a surplus IT resource in a business system can be used for compensating for a shortage of an IT resource in another business system. Thus, a surplus of an IT resource in each business system is distributed among business systems, whereby IT resources in a plurality of business systems operated independently from each other can be used efficiently.

Furthermore, the actual dealing data generating part can record a supply condition regarding a surplus of an actually distributed IT resource as actual dealing data used in the IT resource evaluation system.

A recording medium of the present invention stores an IT resource evaluation program for allowing a computer to execute processing of evaluating a value of an IT resource with at least one of a plurality of business systems operated independently from each other being targeted for an evaluation. The computer is connected to a management system having a mechanism of managing a plurality of IT resources working respectively in the plurality of business systems, and supplying a surplus of an IT resource in any one of the plurality of business systems to another business system demanding the IT resource on a chargeable basis. The IT resource evaluation program allows the computer to execute: demand-and-supply data reading processing of reading demand-and-supply data representing a transition of at least either one of a demand and a supply of an IT resource in all the plurality of business systems, from a demand-and-supply data recording part for storing the demand-and-supply data; actual dealing data reading processing of reading actual dealing data containing at least an actual supply price and an amount of a supplied IT resource when a surplus of an IT resource in any one of the business systems is actually supplied to another business system, from an actual dealing data recording part for storing the actual dealing data; IT resource data input processing of inputting IT resource data regarding a suppliable IT resource in the business system targeted for evaluation, containing at least a suppliable amount of the IT resource and a suppliable period, from the business system targeted for evaluation; and evaluating processing of calculating value data representing a supply price in a case where the suppliable IT resource represented by the IT resource data is supplied during the suppliable period, based on the supply-and-demand data and the actual dealing data.

"IT resource" is hardware and/or software constituting a system using a computer. The IT resource includes, for example, a server, middleware, a network, a storage, various terminals (a personal computer, a PDA, a mobile telephone, etc.), and an RFID tag. The business system is a computer system constituted by an IT resource.

According to the present invention, an IT resource evaluation system capable of providing information on the value of an IT resource, a management system connected to the IT resource evaluation system, an IT resource evaluation program, and a management program can be provided.

BRIEF DESCRIPTION OF THE DRAWINGS

FIG. 10 shows an example of specific data of the surplus determination rule described with the schema shown in FIG. 9.

DETAILED DESCRIPTION OF THE INVENTION

Figure 1:
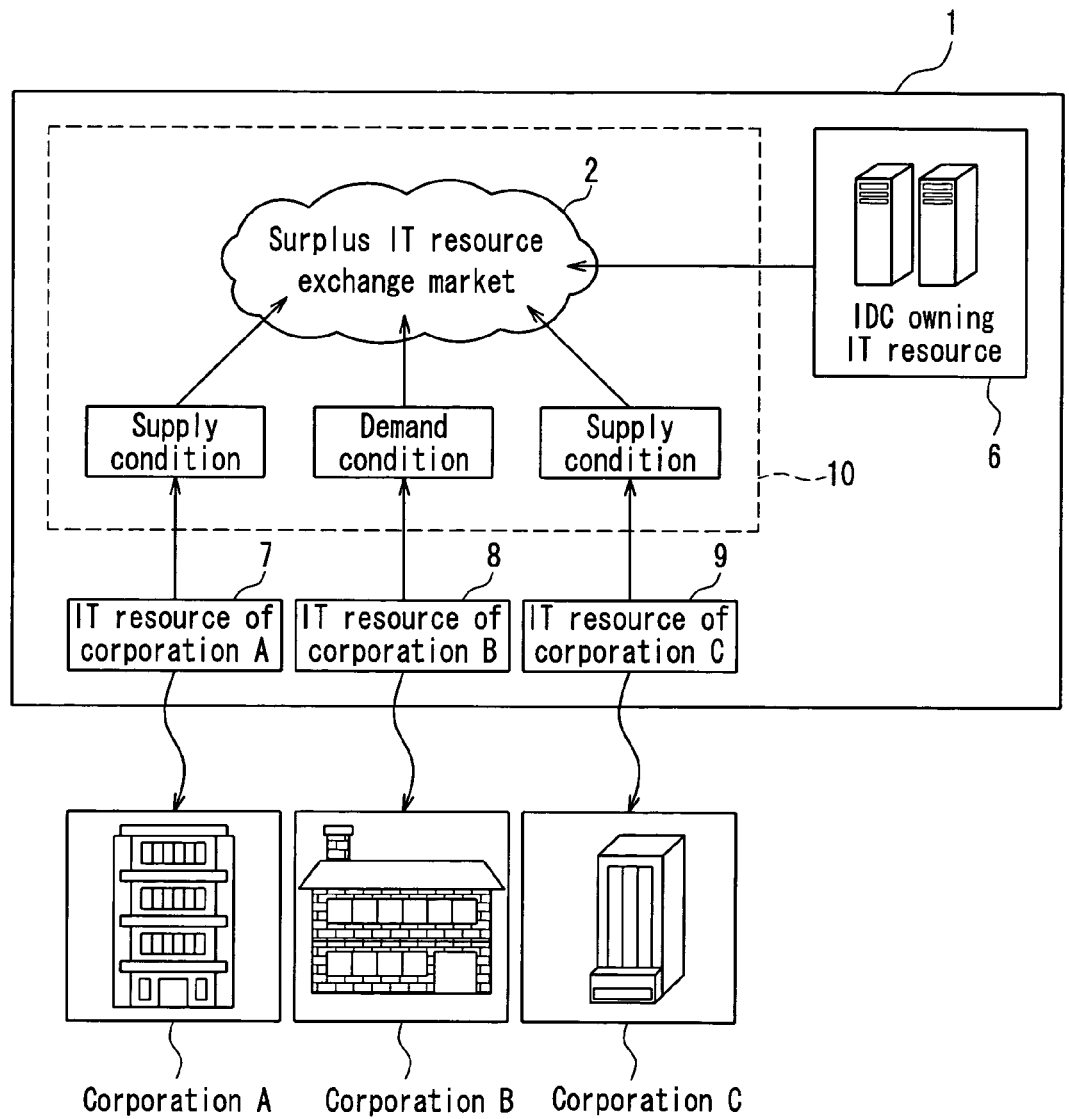
FIG. 1 is a conceptual diagram showing the concept of an entire configuration of an IDC.

An "IT resource" is, for example, hardware and/or software constituting a business system operated by an operator of a corporation. The IT resource includes, for example, a server, middleware, a network, a storage, various terminals (a personal computer, a PDA, a mobile telephone, etc.), and an RFID tag.

In the IT resource evaluation system according to the present invention, it is preferable that the actual dealing data contains an average, a mode, or a median of the actual supply price, and an average, a mode, or a median of the amount of the supplied IT resource.

The evaluating part calculates value data, based on the average, mode, or median of an actual supply price that is a supply price when an IT resource is actually supplied, and the average, mode, or median of an amount of the actually supplied IT resource, so that value data reflecting an actual price is calculated. More specifically, by using a representative value such as the above-mentioned average, mode, or median, value data exactly reflecting the market value of an IT resource is calculated.

The average, mode, or median of the actual supply price may be, for example, an average, mode, or median of an actual supply price during a predetermined period, or an average, mode, or median of an actual supply price in a predetermined type of an IT resource or a predetermined business category.

The average may be an arithmetical mean or geometrical mean. The median is a value of data placed at the center when data are arranged in the order of a size. The mode is a value of data having a largest frequency among the data.

In the IT resource evaluation system according to the present invention, it is preferable that the IT resource data contains a surplus determination rule that is data representing at least a working situation of an IT resource as a requirement for determining a presence/absence of a surplus of the IT resource in the business system and a period targeted for determination, wherein the evaluating part calculates the value data based on either one of a demand and a supply during the period represented by the surplus determination rule, in a transition of the demand or the supply represented by the supply-and-demand data.

The occurrence period and the occurrence amount of a surplus of an IT resource in a business system targeted for evaluation are determined by the period targeted for determination, represented by the surplus determination rule, and a requirement for determining the presence/absence of a surplus. More specifically, the surplus determination rule is used for determining whether or not there is a surplus of an IT resource in the business system targeted for evaluation. Therefore, the evaluating part calculates value data based on the demand or supply during the period targeted for determination, represented by the surplus determination rule, whereby the supply price of a surplus of an IT resource during the period in which the surplus occurs in the business system targeted for evaluation can be calculated.

The evaluating part can calculate a supply price higher than an average price, for example, according to the surplus determination rule in which a surplus occurs in a peak period when the demand of an IT resource increases in all the plurality of business systems. This is because the supply during a peak period contributes to the optimization of a supply-and-demand balance in all the plurality of business systems. On the contrary, the evaluating part can calculate a supply price lower than an average price, for example, according to a surplus determination rule in which a surplus occurs in an off-peak period when the demand of an IT resource decreases in all the plurality of business systems.

It is preferable that the IT resource evaluation system according to the present invention further includes a supply condition data generating part for adding the value data calculated by the evaluating part to the IT resource data, thereby generating supply condition data representing a supply condition for supplying the IT resource.

The supply condition data generating part adds the value data calculated by the evaluating part to IT resource data, thereby generating a supply condition. Therefore, a supply condition under which a supply price is set considering a supply-and-demand balance in all the plurality of business systems and based on the actual deal can be generated.

In the IT resource evaluation system according to the present invention, it is preferable that a surplus determination rule, which is data used for determining that there is a surplus in the IT resource when the surplus of the IT resource in any one of the plurality of business systems is supplied to another business system and which represents a working situation of the IT resource as a requirement for determining a presence/absence of the surplus of the IT resource and a period targeted for determination, is contained in the actual dealing data to be recorded in the actual dealing data recording part, and the IT resource evaluation system further includes a rule generating part for generating a surplus determination rule for each of the plurality of business systems, based on the surplus determination rule contained in the actual dealing data.

The rule generating part generates a surplus determination rule based on a surplus determination rule actually used for determining that there is a surplus of an IT resource and contributing to the supply of the surplus of the IT resource. Therefore, the rule generating part can generate a surplus determination rule that is likely to contribute to the supply of the surplus of the IT resource.

The operating entity of each business system does not want the operating entity of another business system to know its operating policy. Thus, the operating entity of each business system does not know how much value the surplus determination rule of its operating system has in the entire supply-and-demand balance. On the other hand, the management system manages all the business systems, so that it can obtain a surplus determination rule used for determining the presence/absence of a surplus of an IT resource in each business system. Therefore, the IT resource evaluation system connected to the management system can obtain a surplus determination rule in each business system. Thus, the rule generating part can generate a surplus determination rule of each business system so that the supply-and-demand balance is optimized as a whole, based on the surplus determination rule in each business system.

Hereinafter, one embodiment of the present invention will be described in detail with reference to the drawings.

Embodiment 1

Embodiment 1 is directed to an IDC of a utility system having a mechanism for distributing a surplus IT resource among business systems.

FIG. 1 is a conceptual diagram showing the concept of an entire configuration of an IDC 1 in the present embodiment.

The IDC 1 manages IT resources 7, 8, 9 of corporations A, B, C that are operating entities. The corporations A, B, C operate business systems constituted by the IT resources 7, 8, 9, respectively. The IDC 1 includes an IT resource management system 10 for distributing IT resources among different business systems. The IT resources 7, 8, 9 are respectively controlled by the IT resource management system 10 in accordance with requests from the corporations 7, 8, 9. For example, the IT resource management system 10 increases/decreases the IT resource 7 in accordance with a request (i.e., on demand) from the corporation A. An exemplary operation conducted in the IT resource management system 10 will be described below.

For example, supply conditions of the IT resources 7, 9 are presented from the corporations A, C. The corporations A, C present the supply conditions (e.g., a CPU use ratio, the number of bytes used by a storage, a usable period, possible processing conditions (on-line/batch processing), etc.) for supplying surpluses of the IT resources 7, 9, to the IDC 1.

The corporation B presents a demand condition of the IT resource 8. The corporation B presents the demand condition (e.g., a CPU use ratio, the number of bytes used by a storage, a usable period, possible processing conditions (on-line/batch processing), etc.) of an insufficient IT resource, to the IDC 1.

In a surplus IT resource exchange market 2, a supply condition is matched with a demand condition to be fit therefor. For example, in the case where the supply condition of the corporation A is matched with the demand condition of the corporation B, the surplus of the IT resource 7 of the corporation A is supplied to the IT resource 8 of the corporation B.

The difference in the supply/demand between the corporations is compensated by the IDC 1. As a result of the matching processing of the surplus IT resource, in the case where the supply condition is insufficient for the demand condition, the shortage is compensated using an IDC owning IT resource 6. On the contrary, in the case where the supply condition is too large for the demand condition, and the surplus IT resource becomes an oversupply, the IDC 1 purchases the IT resource appropriately.

Figure 2:
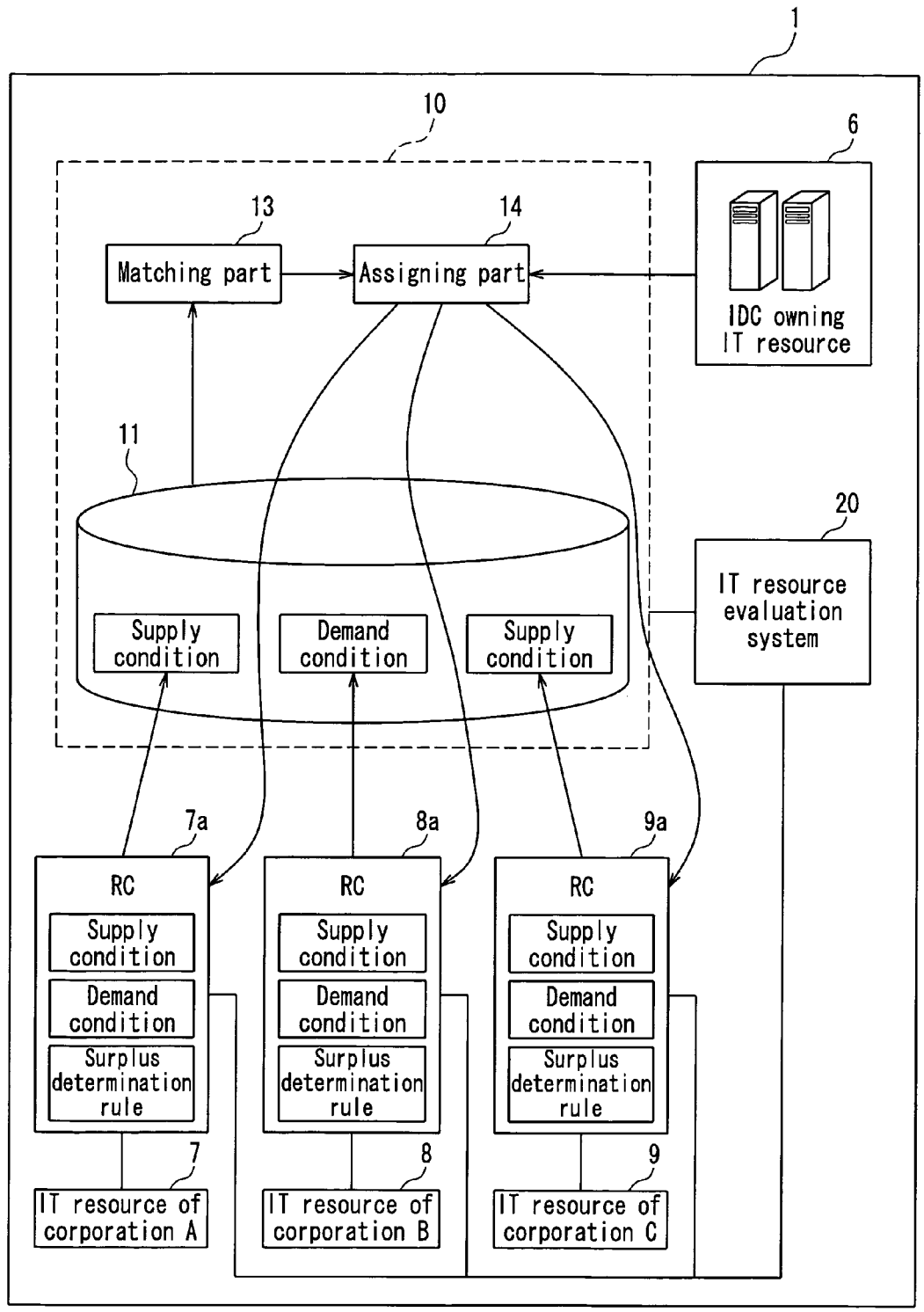
FIG. 2 is a functional block diagram showing an internal configuration of the IDC.

Next, the detailed configuration of the IDC 1 will be described. FIG. 2 is a functional block diagram showing an internal configuration of the IDC 1.

The IT resource management system 10 includes an accumulating part 11, a matching part 13, and an assigning part 14. The accumulating part 11 accumulates supply conditions and demand conditions. The matching part 13 extracts suitable conditions from the supply conditions and demand conditions accumulated in the accumulating part 11. The assigning part 14 assigns the IT resources 7, 8, 9 of the corporations A, B, C in accordance with the conditions extracted by the matching part 13. The assigning part 14 transmits information for increasing/decreasing the respective IT resources 7, 8, 9 to resource coordinators (hereinafter, referred to as RCs) 7a, 8a, 9a, for example. Furthermore, in the case where the conditions extracted by the matching part 13 are insufficient, the assigning part 14 compensates for the shortage using the IDC owning IT resource 6.

In the IT resources 7, 8, 9 of the corporations A, B, C, the RCs 7a, 8a, 9a are deployed. The RCs 7a, 8a, 9a increase/decrease the IT resources 7, 8, 9 in accordance with the information from the assigning part 14.

In the RCs 7a, 8a, 9a, a supply condition, a demand condition, and a surplus determination rule are respectively recorded. The RCs 7a, 8a, and 9a receive, for example, inputs of supply conditions of surplus IT resources and demand conditions of insufficient IT resources from the corporations A, B, C, and store them in recording parts (not shown) provided in the RCs 7a, 8a, and 9a.

Furthermore, the RCs 7a, 8a, and 9a monitor the IT resources 7, 8, and 9 to determine the presence/absence of a surplus. The RCs 7a, 8a, and 9a determine the presence/absence of a surplus based on the surplus determination rule. In the case where there is a surplus, the RCs 7a, 8a, and 9a output the supply conditions to the IT resource management system 10.

An IT resource evaluation system 20 is connected to the IT resource management system 10, and the RCs 7a, 8a, and 9a of the IT resources 7, 8, and 9. The IT resource evaluation system 20 obtains, for example, supply-and-demand data and actual dealing data from the IT resource management system 10. The supply-and-demand data represents, for example, the supply and demand of an IT resource in the entire IDC 1. The actual dealing data represents, for example, a supply price of a surplus IT resource supplied in the IT resource management system 10. Using these data, the IT resource evaluation system 20 calculates value data representing a supply price in the case where an IT resource represented by the supply condition or the surplus determination rule in each of the RCs 7a, 8a, and 9a is supplied. Furthermore, the IT resource evaluation system 20 can generate a supply condition and a surplus determination rule respectively suitable for the IT resources 7, 8, and 9, using the data obtained from the IT resource management system 10. The detail of the processing performed by the IT resource evaluation system 20 will be described later.

The IT resource management system 10 and the IT resource evaluation system 20 can be configured, for example, on a computer of a server or the like. The functions of the matching part 13 and the assigning part 14 can be realized when a CPU of a computer executes a predetermined program. As the accumulating part 11, a portable recording medium such as a flexible disk or a memory card, a recording medium in a recording apparatus on a network, or the like, as well as a recording medium such as a hard disk or a RAM stored in a computer can be used. The IT resource management system 10 and the IT resource evaluation system 20 can be composed of one server, or can be configured in such a manner that the function is distributed in a plurality of servers.

Figure 3:
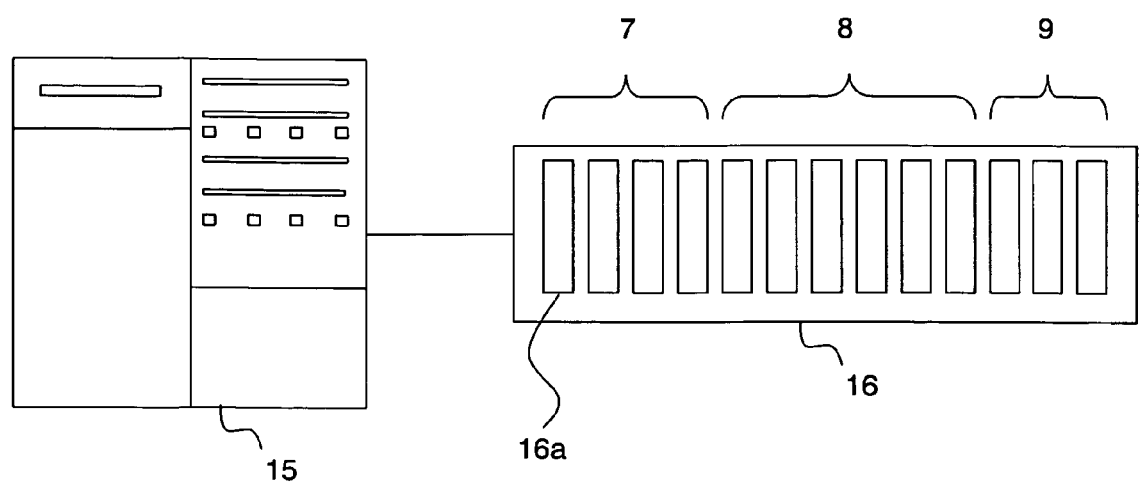
FIG. 3 shows exemplary physical configurations of an IT resource management system and IT resources.

FIG. 3 shows exemplary physical configurations of the IT resource management system 10, the IT resource evaluation system 20, and the IT resources 7, 8, 9. As shown in FIG. 3, the IT resource management system 10, the IT resource evaluation system 20, and the IT resources 7, 8, 9 are composed of, for example, a blade server 16 including a plurality of server blades 16a, and a deployment server 15 managing the blade server 16. The blade server 16 and the deployment server 15 are connected to each other, for example, through a LAN or the like.

The IT resource management system 10 and the IT resource evaluation system 20 can be configured on the deployment server 15. The plurality of server blades 16a in one blade server 16 are assigned to the IT resource 7 of the corporation A, the IT resource 8 of the corporation B, and the IT resource 9 of the corporation C. The RCs 7a, 8a, 9a can be operated on the deployment server 15. The IT resources 7, 8, 9 can also be composed of blade servers that are physically independent from each other.

Figure 4:
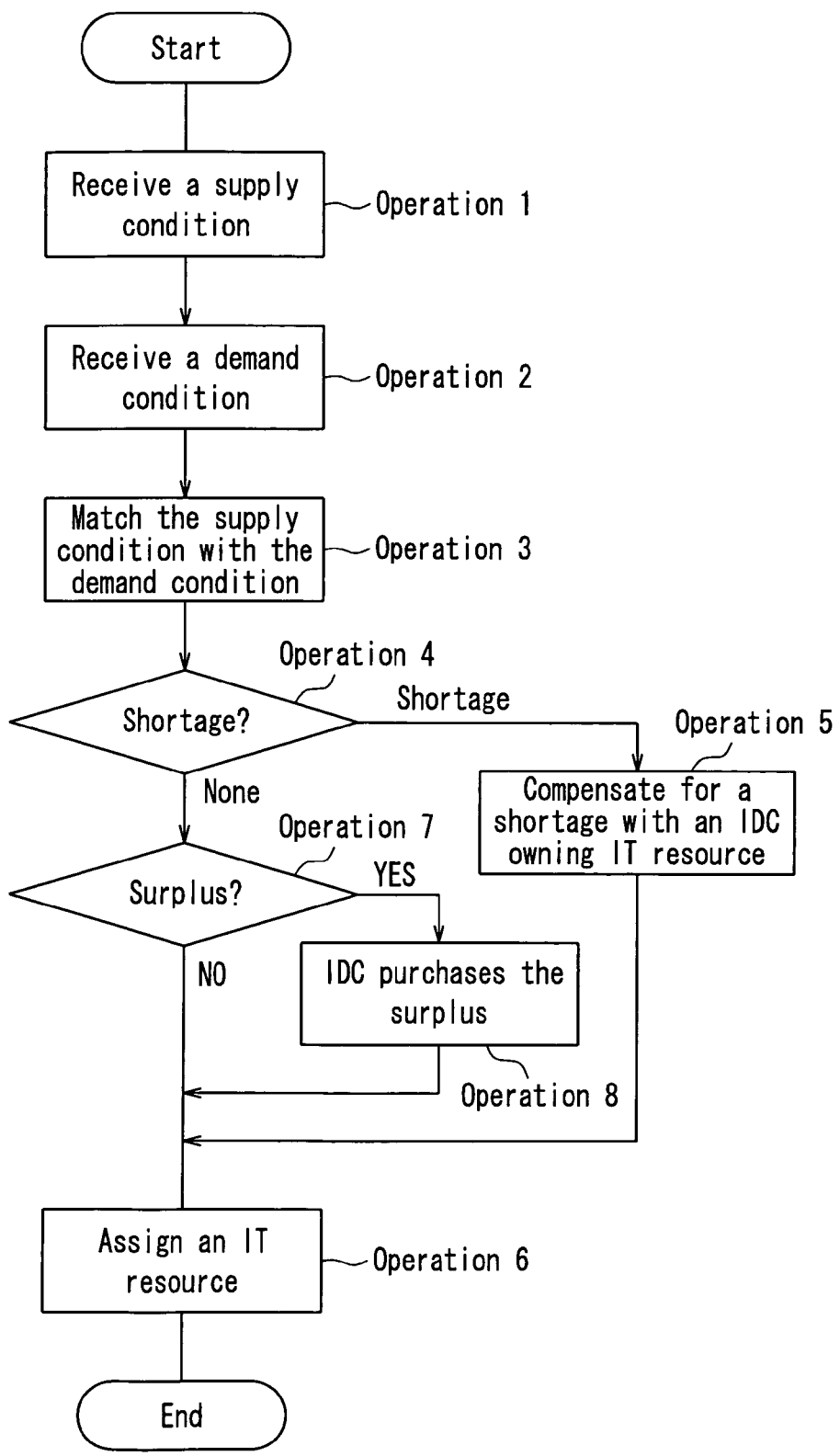
FIG. 4 is a flow chart illustrating an operation of surplus IT resource management processing by the IT resource management system.

Next, the operation of processing for the IT resource management system 10 to distribute a surplus IT resource will be described with reference to FIG. 4. FIG. 4 is a flow chart illustrating an exemplary flow of surplus IT resource management processing by the IT resource management system 10.

The summary of the processing will be described with reference to FIG. 4. First, the IT resource management system 10 receives supply conditions (Operation 1). Generally, a plurality of supply conditions are presented from a plurality of corporations. The IT resource management system 10 receives data representing the supply conditions sent from the corporations and stores them in the accumulating part 11.

For example, in the case where there is a surplus in the IT resource 7 of the corporation A, the RC 7a automatically detects a surplus. The RC 7a determines that there is a surplus, for example, when the IT resource 7 satisfies a requirement represented by the surplus determination rule recorded in the RC 7a. Upon detecting a surplus, the RC 7a outputs the previously registered supply condition to the IT resource management system 10. The IT resource management system 10 receives the supply condition and accumulates it in the accumulating part 11.

Next, the IT resource management system 10 receives demand conditions (Operation 2). Generally, a plurality of demand conditions are presented. The IT resource management system 10 receives data representing the demand conditions sent from corporations and stores them in the accumulating part 11.

For example, in the case where there is a shortage in the IT resource 8 of the corporation B, the RC 8a of the corporation B automatically detects the shortage of the IT resource 8. The RC 8a outputs the previously registered demand condition to the IT resource management system 10. The IT resource management system 10 receives the output demand condition and accumulates it in the accumulating part 11.

The matching part 13 matches the supply condition and the demand condition stored in the accumulating part 11 with each other (Operation 3). Exemplary data configurations of the supply condition and the demand condition will be described later.

The assigning part 14 determines whether or not there is a shortage with respect to the demand condition, in the supply condition extracted as a result of the matching (Operation 4).

In the case where the extracted supply condition is insufficient for the demand condition, the assigning part 14 compensates for the shortage using the IDC owning IT resource 6 (Operation 5).

For example, in the case where the supply condition is "400 GB of a hard disk capacity can be supplied" while the demand condition is "500 GB of a hard disk capacity is required", the shortage is 100 GB. The assigning part 14 allows a demanding corporation to use 100 GB of a hard disk of the IDC owning IT resource 6.

In the case of no shortage, the assigning part 14 determines whether or not there is a surplus with respect to the demand condition, in the supply condition extracted as a result of the matching (Operation 7).

In the case where there is a surplus with respect to the demand condition in the extracted supply condition, the assigning part 14 performs processing of allowing the IDC to purchase the surplus and to add it to the IDC owning IT resource 6 (Operation 8).

In the case of no surplus, the assigning part 14 assigns an IT resource (Operation 6). More specifically, the assigning part 14 assigns an IT resource presented by the supply condition extracted as a result of the matching to a corporation that demands an IT resource under the demand condition extracted as a result of the matching, in such a manner that the corporation can use the IT resource.

Figure 5:
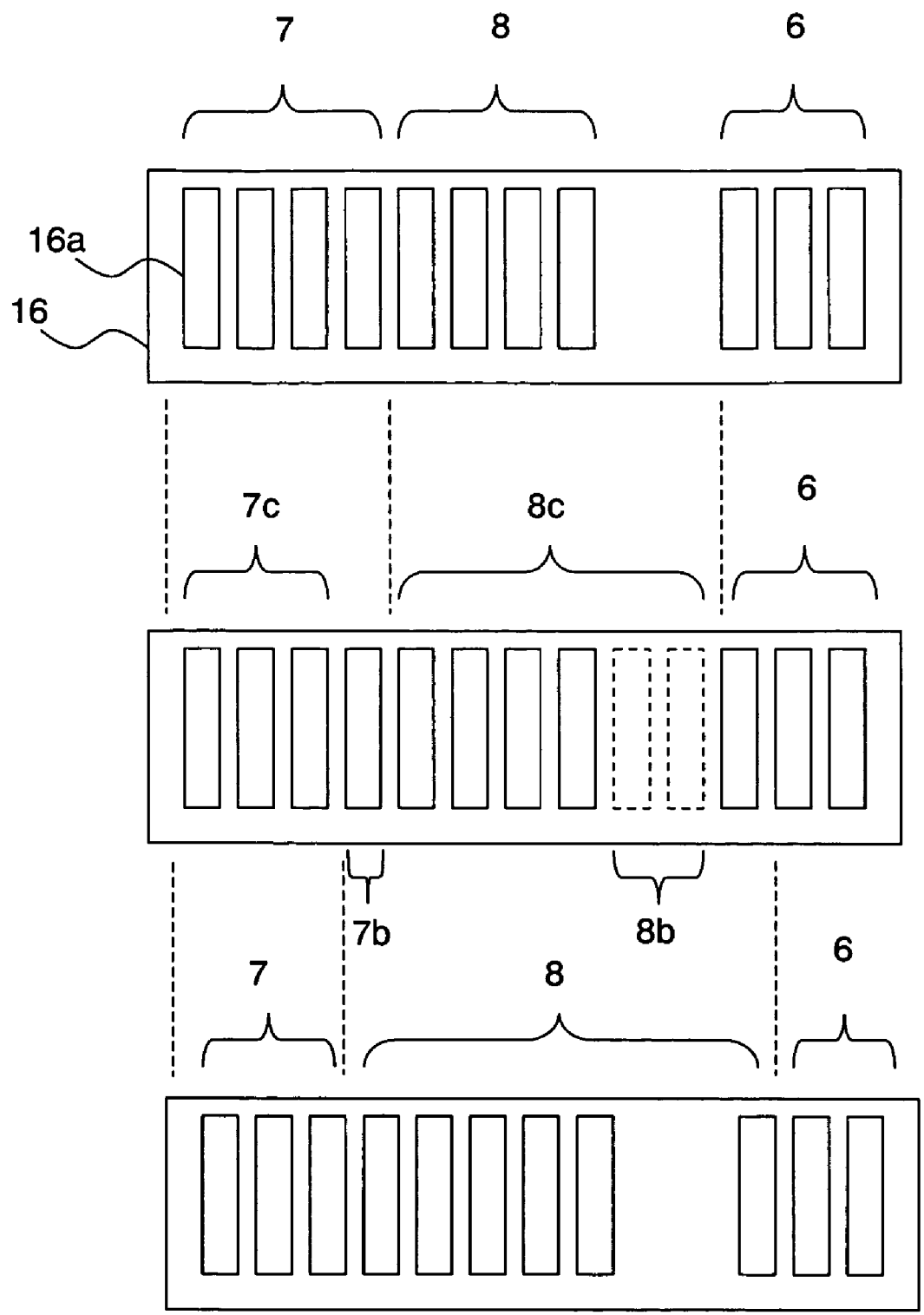
FIG. 5 shows an exemplary virtual configuration of a blade server in the case where a surplus of an IT resource is assigned to another IT resource.

As an example, the processing of the assigning part 14 in the case where the content of the extracted supply condition is to supply a surplus of the IT resource 7, and the content of the demand condition matched with the supply condition is to compensate for a shortage in the IT resource 8 will be described. FIG. 5 shows an exemplary virtual configuration of a blade server in the case where the surplus of the IT resource 7 is assigned to the IT resource 8.

As shown in an upper stage of FIG. 5, the blade server 16 includes 11 server blades 16a. Among the 11 server blades 16a, 4 server blades 16a are assigned to the IT resource 7 of the corporation A, 4 server blades 16a are assigned to the IT resource 8 of the corporation B, and the remaining 3 server blades 16a are assigned to the IDC owning IT resource 6.

An intermediate stage of FIG. 5 shows an IT resource 7c required by the corporation A at a certain time, and an IT resource 8c required by the corporation B at that time. The IT resource 7c required by the corporation A is 3 server blades 16a, so that one server blade becomes a surplus 7b. On the other hand, the IT resource 8c required by the corporation B is 6 server blades 16a, so that 2 server blades 16a become a shortage 8b.

Herein, the case will be described where the supply condition output from the RC 7a of the corporation A so as to supply the surplus 7b and the demand condition output from the RC 8a of the corporation B so as to compensate for the shortage 8b are extracted in the matching part 13. The assigning part 14 notifies the RC 7a of the corporation A that the server blade 16a of the surplus 7b is used in the business system of the corporation B. The RC 7a changes the logical setting of the server blade 16a so that the server blade 16a corresponding to the surplus 7b works as the IT resource 8 of the business system of the corporation B.

Furthermore, the assigning part 14 requests the RC 8a of the corporation B to assign the server blade 16a of the surplus 7b of the corporation A to the IT resource 8 to compensate for the shortage 8b. The RC 8a changes the logical setting of the server blade 16a so that the surplus 7b works as the IT resource 8 in the business system of the corporation B. In this case, merely by assigning the surplus 7b to the IT resource 8 cannot compensate for the shortage 8b completely. Therefore, the assigning part 14 changes the logical setting of the server blade 16a so that the server blade 16a of the IDC owning IT resource 6 works as the IT resource 8 of the corporation B.

Consequently, as shown in a lower stage of FIG. 5, 3 server blades 16a are assigned to the IT resource 7 of the corporation A, and 6 server blades 16a are assigned to the IT resource 8 of the corporation B.

Software used by the corporation B is installed in the server blade 16a assigned to the IT resource 8 of the corporation B, and started. Thus, the corporation B comes to be able to use the surplus 7b of the IT resource 7 of the corporation A.

The operation in which the surplus 7b of the IT resource 7 is assigned to the IT resource 8 of the corporation B may be the one in which the logical configuration in an apparatus is changed as described above, or in which the apparatus such as a server is physically moved.

In the processing shown in FIG. 4, the IT resource management system 10 receives supply conditions at all times (Operation 1), and may perform the processing in Operations 2 to 8 every time the IT resource management system 10 receives one demand condition. Such processing is used for on-line processing. At this time, the processing in Operations 7 and 8 is not necessarily required to be performed at a timing of receiving a demand condition, and batch processing may be performed appropriately.

Furthermore, the following may be performed. The IT resource management system 10 receives supply conditions (Operation 1) and receives demand conditions (Operation 2) at all times, accumulates the supply conditions and the demand conditions, and performs Operations 3 to 8 with batch processing.

Figure 6:
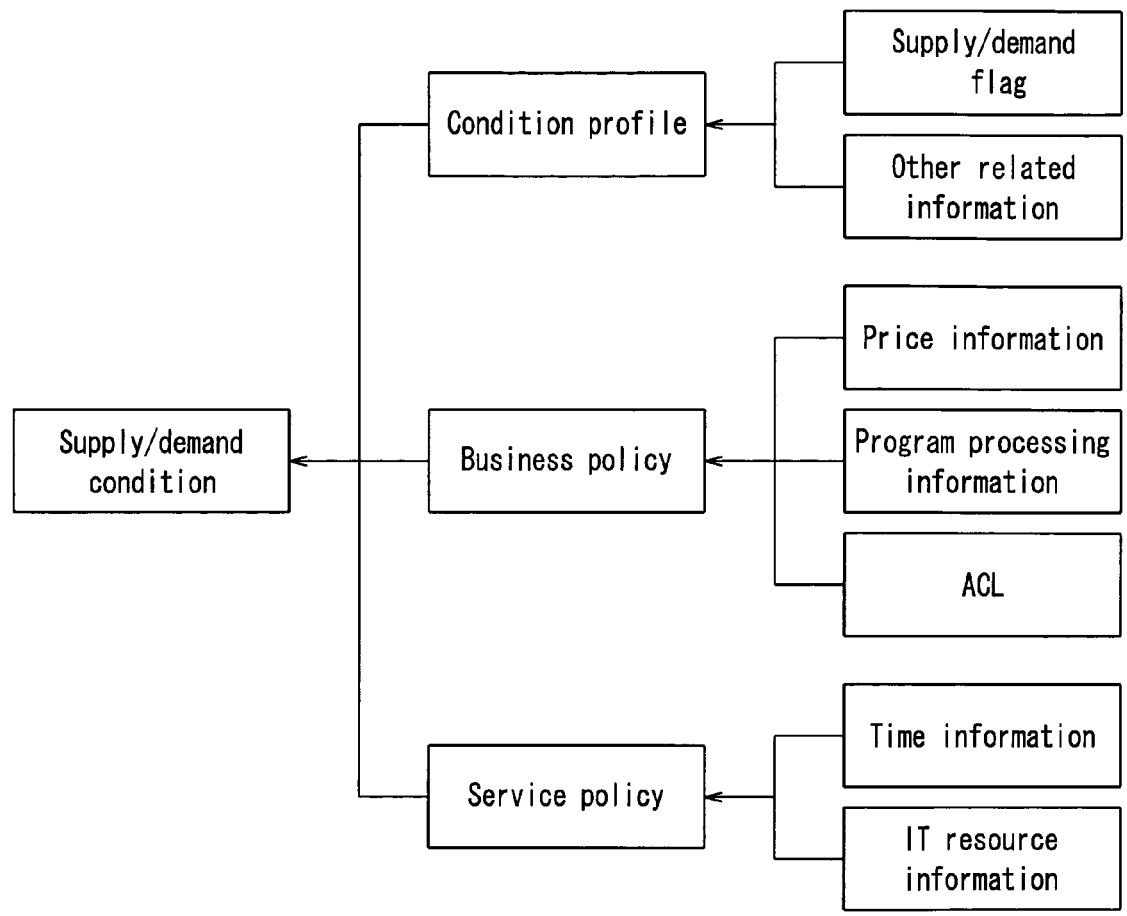
FIG. 6 shows an exemplary schema of information showing a demand condition and a supply condition.

Next, exemplary data configurations of the supply condition and the demand condition will be described. FIG. 6 shows an exemplary schema of information representing the demand condition and the supply condition.

It is preferable that the demand condition and the supply condition can be described with the similar schema so as to facilitate the matching processing. The schema shown in FIG. 6 can be used for both the demand condition and the supply condition.

The demand condition and the supply condition include information such as the amount of IT resources (a CPU use ratio, the number of bytes used by a storage, etc.), a use time band, a usable period, accounting conditions, program processing contents (batch processing, on-line processing, etc.), and business constrains (that can be provided only to a group corporation, etc.). The schema shown in FIG. 6 corresponds to these pieces of organized information.

In the schema shown in FIG. 6, the supply condition/demand condition include a condition profile, a business policy, and a service policy.

The condition profile includes a supply/demand flag, and other related information. Depending upon the supply/demand flag, it is determined whether certain condition data is a supply condition or a demand condition.

The business policy refers to a business requirement of a corporation that is an operating entity of an IT resource. For example, price information, program processing information, an ACL determining whether or not a corporation is a group corporation, and the like are included in the business policy.

The contents of the price information are, for example, as follows: "a supply price will be charged by ¥__ with respect to a CPU use ratio" or "an IT resource that can be used by ¥__ will be demanded preferentially with respect to a CPU use ratio". Examples of the program processing information include "on-line processing" and "batch processing". Examples of the ACL include "a bank-related corporation is OK as a corporation for a supply destination, but a corporation in the XX business world is rejected" and "an IT resource of a group corporation will be demanded preferentially".

The service policy defines a system performance requirement and/or an operation rule of an IT resource operated by a corporation. For example, use time information, supply time information, IT resource information, and the like are included in the service policy.

An example of the service policy of the supply condition includes "at night, when a CPU use ratio becomes 10% or less, 50% of an IT resource may be supplied for batch processing until 7 a.m.". An example of the service policy of the demand condition includes "at night, if batch processing is unlikely to be finished before 5 a.m., an IT resource will be demanded".

If the business policy and the service policy are described together, a plurality of demand conditions or a plurality of supply conditions having the same business policies can be merged.

In a general IT resource assignment, matching is performed based on the detail of IT resource information inside a service policy. However, actually, unless "business policy" such as "price", "program processing contents", and "ACL" is matched, supply/demand processing cannot be performed. Thus, by performing merging processing with respect to a business policy before performing detailed matching processing of an IT resource, a division loss and a surplus resource can be reduced, and an efficient assignment can be performed (the detail of processing will be described later).

Figure 7:
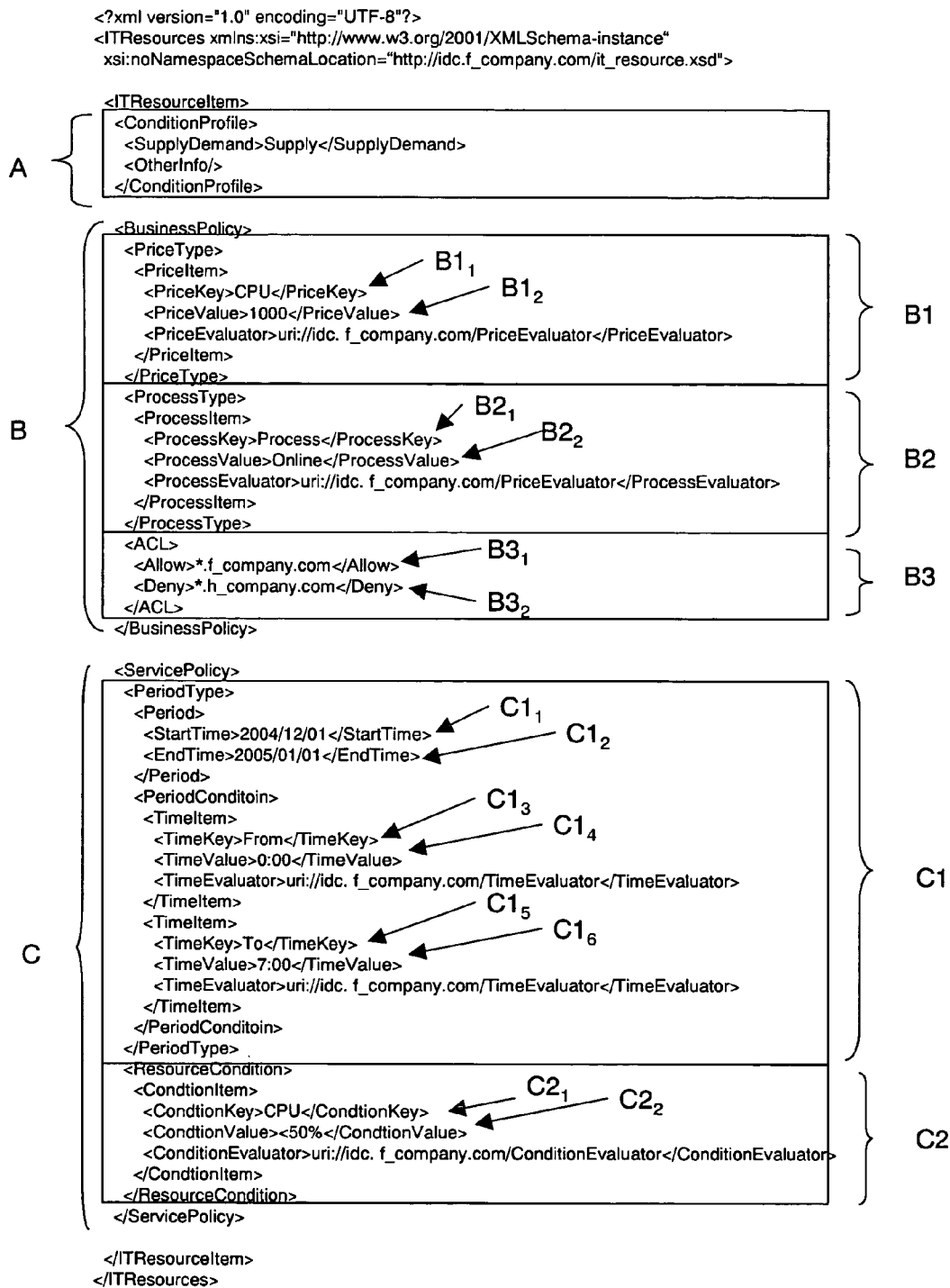
FIG. 7 is a view showing an example of specific data representing a supply condition.

FIG. 7 shows an example of specific data representing a supply condition described with the schema shown in FIG. 6. The supply condition shown in FIG. 7 is described in an XML format, for example.

In FIG. 7, a condition profile is described in a portion represented by A, a business policy is described in a portion represented by B, and a service policy is described in a portion represented by C.

More specifically, in the portion represented by A, a supply is shown with a <SupplyDemand> tag describing a supply/demand flag.

In the business policy, price information is described in a portion represented by B1. More specifically, <PriceKey> tag $B1_1$ shows that the target of a price is a CPU use ratio (CPU). <PriceValue> tag $B1_2$ shows that the price is ¥1,000 (1000).

In the portion represented by B2, program processing information is described. More specifically, <ProcessValue> tag $B2_2$ shows that a process represented by <ProcessKey> tag $B2_1$ is on-line processing (OnLine).

In the portion represented by B3, ACL is described. More specifically, <Allow> tag $B3_1$ shows that a corporation that is capable of supplying is "f_company.com". <Deny> tag $B3_2$ shows that a corporation that is not capable of supplying is "h_company.com".

In the service policy, time information is described in a portion represented by C1. More specifically, <StartTime> tag $C1_1$ shows that the start of a supply possible period is Dec. 1, 2004, and <EndTime> tag $C1_2$ shows that the end of a supply possible period is Jan. 1, 2005. Furthermore, <TimeValue> tag $C1_4$ shows that a start time (From) of a supply possible period represented by <TimeKey> tag $C1_3$ is 0:00. Similarly, <TimeValue> tag $C1_6$ shows that an end time (To) of a supply possible period represented by <TimeKey> tag $C1_5$ is 7:00.

In a portion represented by C2, IT resource information is described. More specifically, <ConditionValue> tag $C2_2$ shows that a performance index (CPU use ratio) of an IT resource represented by a <ConditionKey> tag $C2_1$ is 50%.

(IT Resource Evaluation System)

Figure 8:
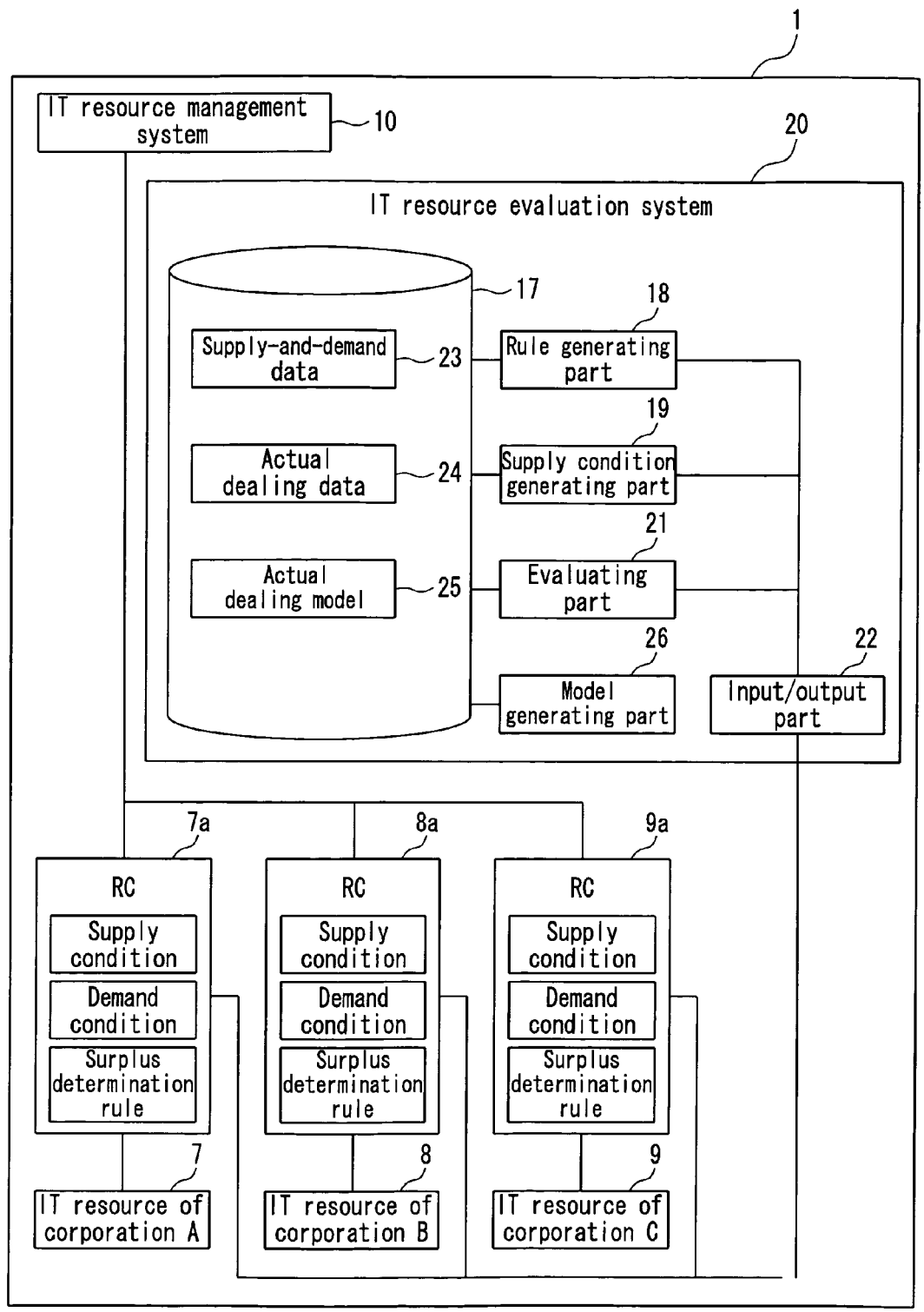
FIG. 8 is a functional block diagram showing a configuration of an IT resource evaluation system.

Next, the IT resource evaluation system 20 will be described. FIG. 8 is a functional block diagram showing a configuration of the IT resource evaluation system 20. The IT resource evaluation system 20 includes a supply condition generating part 19, a rule generating part 18, an evaluating part 21, a model generating part 26, an input/output part 22, and a recording part 17. The IT resource evaluation system 20 is connected to the IT resource management system 10, and the RCs 7*a*, 8*a*, and 9*a* of the IT resources 7, 8, and 9. For example, supply-and-demand data 23 and actual dealing data 24 generated in the IT resource management system 10 are recorded in the recording part 17.

The model generating part 26 generates actual dealing model 25 based on the supply-and-demand data 23 and the actual dealing data 24 recorded in the recording part 17. The detail of the processing of generating an actual dealing model will be described later.

The input/output part 22 includes an interface for data communication between the RCs 7*a*, 8*a*, and 9*a*, and the IT resource evaluation system 20. The input/output part 22 reads a supply condition or a surplus determination rule, for example, from the RC 7*a* among the RCs 7*a*, 8*a*, and 9*a*, and gives it to the evaluating part 21. The evaluating part 21 calculates value data representing a supply price regarding the IT resource 7 that can be supplied, represented by the supply condition or the surplus determination rule received from the input/output part 22. When the evaluating part 21 calculates value data, at least one of the supply-and-demand data 23, the actual dealing data 24, and the actual dealing model 25 is used. The value data calculated by the evaluating part 21 is transmitted to the RC 7a via the input/output part 22.

Furthermore, for example, in the case where the input/output part 22 inputs a supply condition with a supply price undetermined from the RC 7a, after the evaluating part 21 calculates value data regarding the supply condition, the supply condition generating part 19 may add the value data to the supply condition. Consequently, a supply condition with a supply price set is generated. The supply condition with a supply price set is returned to the RC 7a via the input/output part 22.

Furthermore, the input/output part 22 receives a request of generating a surplus determination rule from the RCs 7a, 8a, and 9a. When the input/output part 22 receives a request of generating a surplus determination rule, the rule generating part 18 generates a surplus determination rule. When the rule generating part 18 generates a surplus determination rule, at least one of the supply-and-demand data 23, the actual dealing data 24, and the actual dealing model 25 is used. The surplus determination rule generated by the rule generating part 18 is transmitted to the RCs 7a, 8a, and 9a via the input/output part 22.

Herein, the surplus determination rule is, for example, data containing at least information representing a requirement of a working situation for the IT resource 7 to be determined to have a surplus. The requirement of the working situation includes, for example, information representing a period targeted for determination, the type of an IT resource, and a working amount.

(Surplus Determination Rule)

Figure 9:
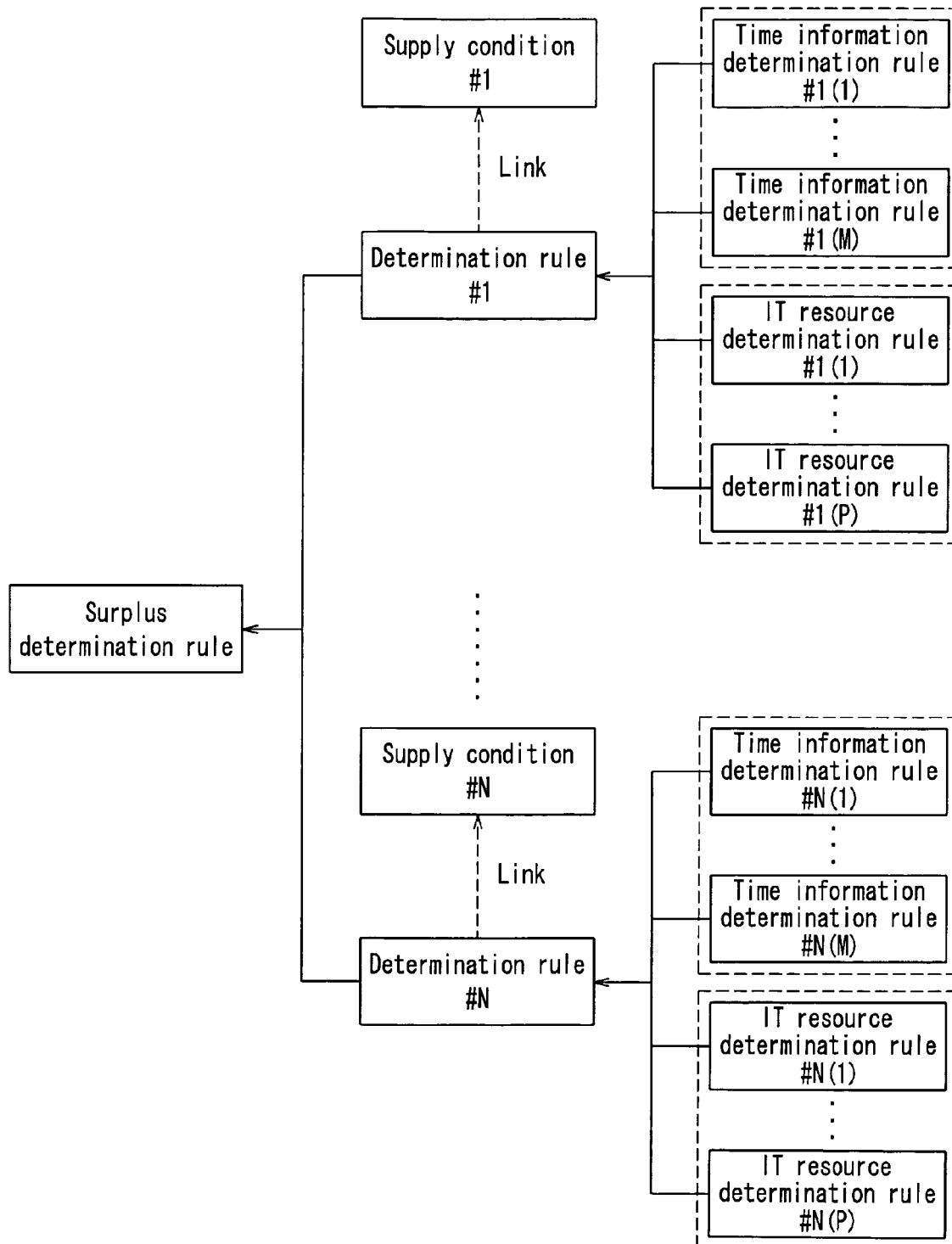
FIG. 9 shows an exemplary schema of data contained in a surplus determination rule.

Hereinafter, the surplus determination rule will be described. FIG. 9 shows an exemplary schema of data contained in the surplus determination rule.

In the example shown in FIG. 9, the surplus determination rule has a hierarchical structure. A level right below an uppermost level (surplus determination rule), a plurality of determination rules #1 to #N are included (N is an integer of 2 or more). The determination rules #1 to #N are linked to the corresponding supply conditions #1 to #N. Because of this, for example, in the case where the RC7a determines that there is a surplus in the IT resource 7 based on the determination rule #1, the RC 7a can output the supply condition #1 linked to the determination rule #1 to the IT resource management system 10.

In lower levels of the respective determination rules #1 to #N, time information determination rules #1(1) to #N(M) and IT resource determination rules #1(1) to #N(P) are included (M, P are integers of 2 or more). For example, in a lower level of the determination rule #1, M time information determination rules #1(1) to #1(M) and P IT resource determination rules #1(1) to #1(P) are present.

The time information determination rule is a determination rule regarding time information. The time information determination rule contains, for example, information representing a period targeted for determination by the RCs 7a, 8a, and 9a. More specifically, the RCs 7a, 8a, and 9a determine the working situation during a period determined by the time information determination rule in the period during which the IT resources 7, 8, and 9 are working.

The IT resource determination rule is, for example, information representing the working situations for determining the IT resources 7, 8, and 9 to have a surplus. The IT resource determination rule contains, for example, information for specifying the kind of the working amount of the IT resources 7, 8, 9 to be determined and the value presenting the working amount. Examples of the kind of the working amount of the IT resources 7, 8, 9 to be determined include a CPU use ratio, a hard disk use capacity, and a transaction performed by a server. Examples of the value representing the working amount include a CPU use ratio, a hard disk use capacity, and the number of transactions performed by a server, such as 30%, 300 GB, and 1000 transactions/time, respectively.

FIG. 10 shows a specific example of data of a surplus determination rule described with the schema shown in FIG. 9. The surplus determination rule shown in FIG. 10 is described in an XML form, as an example. In FIG. 10, in a portion represented by D, a link to a supply condition in a <RefITResourceItem> tag is described.

In portions represented by E1, E2, i.e., <TimeItem> tags in a lower level of a <PeriodCondition> tag in a lower level of a <PeriodType> tag, for example, time information determination rules #1(1), #1(2) are described. The time information determination rule #1(1) represented by E1 describes that the working situation of "0:00 to 7:00" is to be determined. The time information determination rule #1(2) represented by E2 describes a condition that the working situation of "weekdays other than weekends" is to be determined.

In a portion represented by F, i.e., a <ResourceItem> tag in a lower level of a <ResourceType> tag, for example, an IT resource determination rule #1(1) is described. The IT resource determination rule #1(1) describes a condition: it is determined that there is a surplus in the case where "a CUP use ratio is less than 30%".

Thus, the condition represented by the determination rule #1 is a condition: it is determined that there is a surplus in the case where "a CUP use ratio is less than 30%" in "0:00 to 7:00" in "weekdays other than weekends".

(IT Resource Evaluation Processing)

Figure 11:
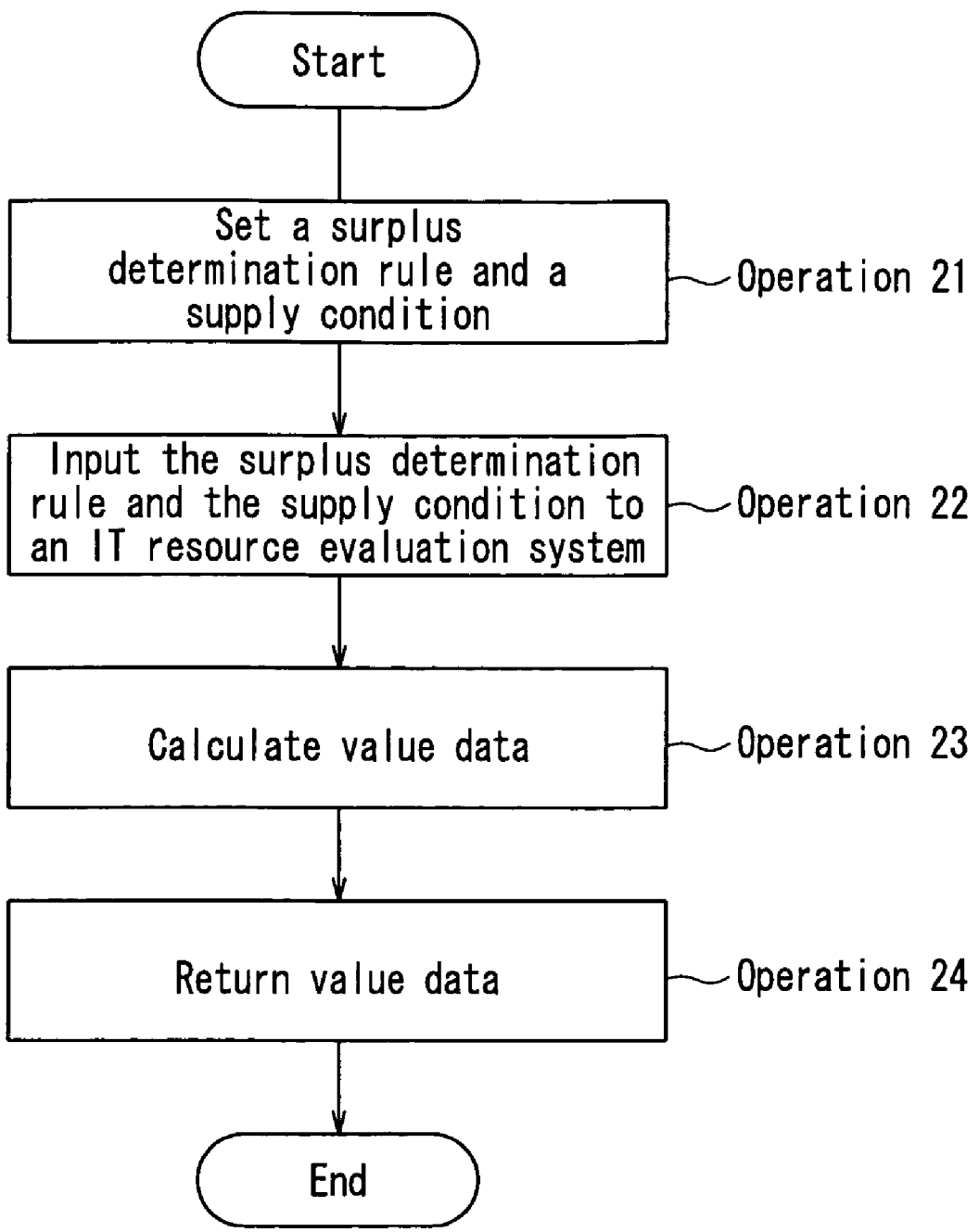
FIG. 11 is a flow chart illustrating an example of a schematic flow of IT resource evaluation processing.

Next, an operation in which the IT resource evaluation system 20 performs an IT resource evaluation will be described. FIG. 11 is a flow chart showing an example of a schematic flow of IT resource evaluation processing.

First, the corporations A, B, and C operating business systems independent from each other, using the IT resources 7, 8, and 9, set a surplus determination rule and a supply condition respectively in the RCs 7a, 8a, and 9a (Operation 21). Hereinafter, the case where the corporation A sets a supply determination rule and a supply condition in the RC 7a will be described.

The RC 7a transmits the surplus determination rule and the supply condition to the IT resource determination system 20 (Operation 22). The input/output part 22 of the IT resource evaluation system 20 receives the surplus determination rule and the supply condition transmitted from the RC 7a and gives them to the evaluating part 21.

The evaluating part 21 calculates value data representing the supply price of a suppliable IT resource represented by the surplus determination rule and the supply condition (Operation 23). The input/output part 22 returns the calculated value data to the RC 7a (Operation 24).

Figure 12:
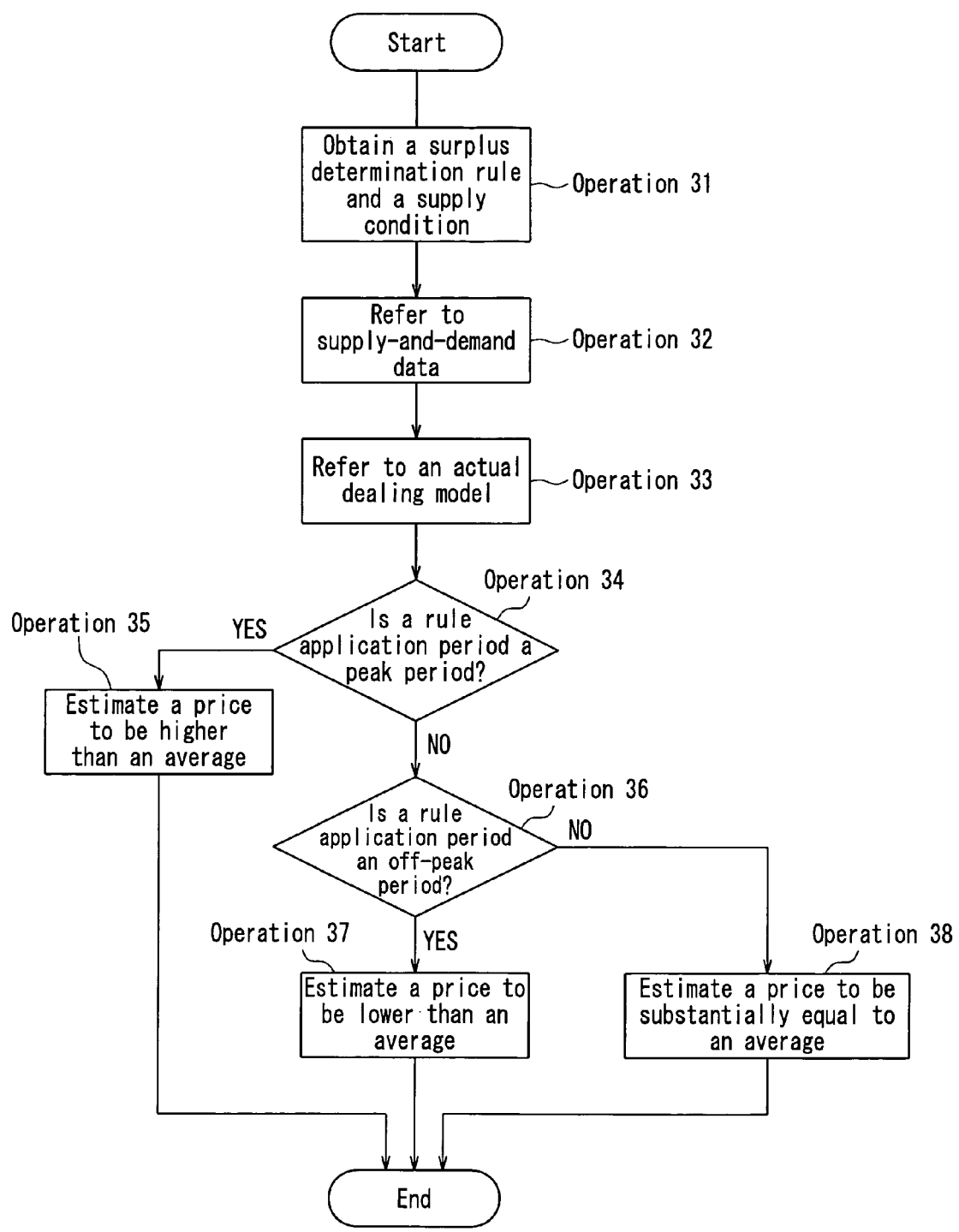
FIG. 12 is a flow chart illustrating an exemplary flow of processing in which an evaluation part calculates value data.

Next, an example of processing in which the evaluating part 21 calculates value data in Operation 3 will be described. FIG. 12 is a flow chart showing an exemplary flow of processing in which the evaluating part 21 calculates value data.

The evaluating part 21 receives the surplus determination rule and the supply condition targeted for evaluation from the input/output part 22 (Operation 31). Herein, the surplus determination rule is, for example, data describing the working situation of the IT resource 7 as a requirement for determining the presence/absence of a surplus and the period targeted for determination in the IT resource 7, as described above. The supply condition contains at least data representing the suppliable amount and the suppliable period of the surplus of the IT resource, as described above.

The evaluating part 21 refers to the supply-and-demand data 23 in order to evaluate the value of an IT resource represented by the surplus determination rule and the supply condition (Operation 32). The supply-and-demand data 23 represents, for example, the transition of either one of the demand and supply of an IT resource in the entire IT resource managed by the IT resource management system 10.

The supply-and-demand data 23 is generated, for example, based on an operation log in the IT resource management system 10. The IT resource evaluation system 20 may generate the supply-and-demand data 23, for example, by automatically extracting the working situation of an IT resource represented by the CPU use ratio of a server, the number of processing transactions, the number of accesses to the server, the transition of a storage use capacity, and the like, from the operation log. At this time, the IT resource evaluation system 20 can include an average of data representing the working situations in a plurality of IT resources during a predetermined period in the supply-and-demand data 23.

Figure 13A:
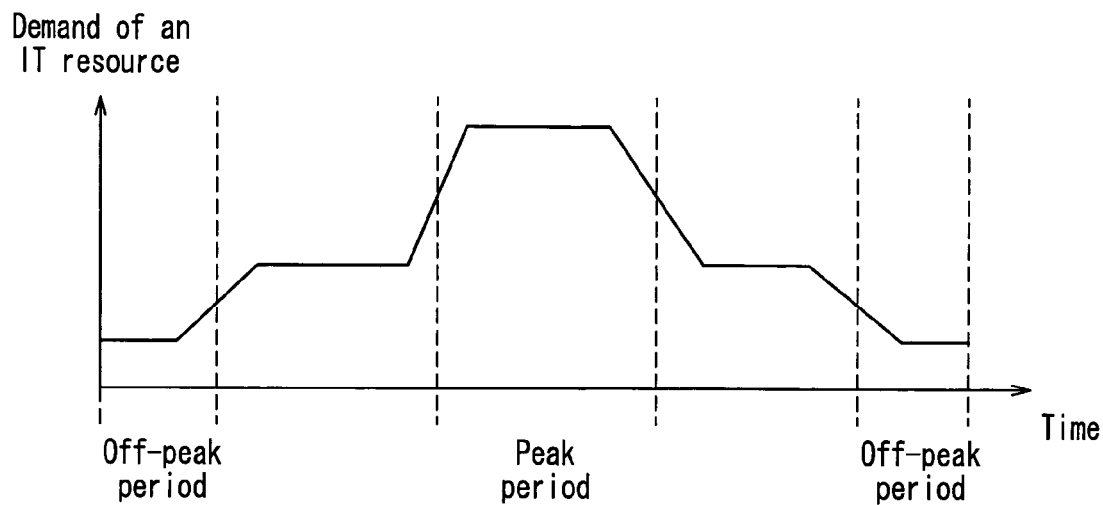
FIG. 13A shows an exemplary transition of a demand in an entire IT resource represented by supply-and-demand data.
Figure 13B:
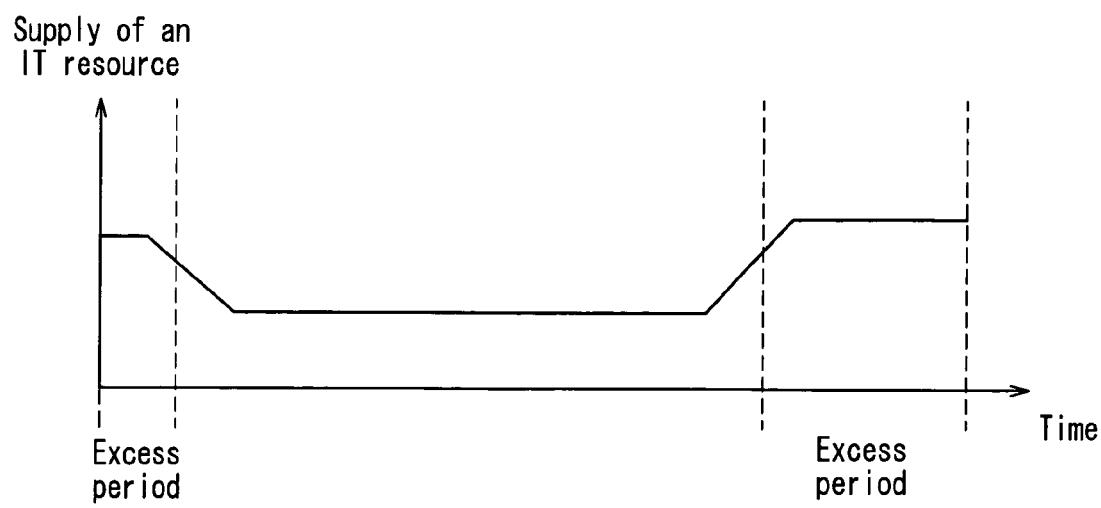
FIG. 13B shows an exemplary transition of a supply in the entire IT resource represented by the supply-and-demand data.

FIG. 13A shows an exemplary transition of a demand in the entire IT resource represented by the supply-and-demand data 23. FIG. 13B shows an exemplary transition of a supply in the entire IT resource represented by the supply-and-demand data 23. In the graph of FIG. 13A, a vertical axis represents the demand of an IT resource, and a horizontal axis represents a time. In the graph of FIG. 13B, a vertical axis represents the supply of an IT resource, and a horizontal axis represents a time. FIGS. 13A and 13B show a transition of a demand or a supply for one year from January to December, as an example. As the value representing the demand or supply of an IT resource, for example, the number of accesses, a CPU use ratio, the number of transactions, a storage use capacity, and the like are used. An example of the supply-and-demand data 23 includes data obtained by accumulating an average for each week of the number of accesses to a server in the entire IT resources managed by the IT resource management system 10 for one year.

In the graph shown in FIG. 13A, the period during which the demand of an IT resource exceeds a predetermined value can be set to be a peak period, and the period during which the demand of an IT resource is less than a predetermined value can be set to be an off-peak period. Similarly, in the graph shown in FIG. 13B, the period during which the supply of an IT resource exceeds a predetermined value can be set to be an excess period. The above description is an example of the supply-and-demand data 23.

The evaluating part 21 also refers to the actual dealing model 25 in order to evaluate the value of an IT resource represented by a surplus determination rule and a supply condition (Operation 33).

Herein, the actual dealing data 24 and the actual dealing model 25 will be described. The actual dealing model 25 is data containing, for example, respective representative values for each period or for each business category of the supply price under the supply condition actually approved in the IT resource management system 10 and the amount of a supplied IT resource. Examples of the representative values include an average, a median, and a mode. The actual dealing model 25 can be generated by the model generating part 26 based on the actual dealing data 24. The detail of the processing in which the model generating part 26 generates the actual dealing model 25 will be described later.

The actual dealing data 24 is, for example, data obtained by accumulating a surplus determination rule, a supply condition, and a demand condition when an IT resource is supplied in the IT resource management system 10. The actual dealing data 24 can be obtained from the IT resource management system 10.

Figure 14:
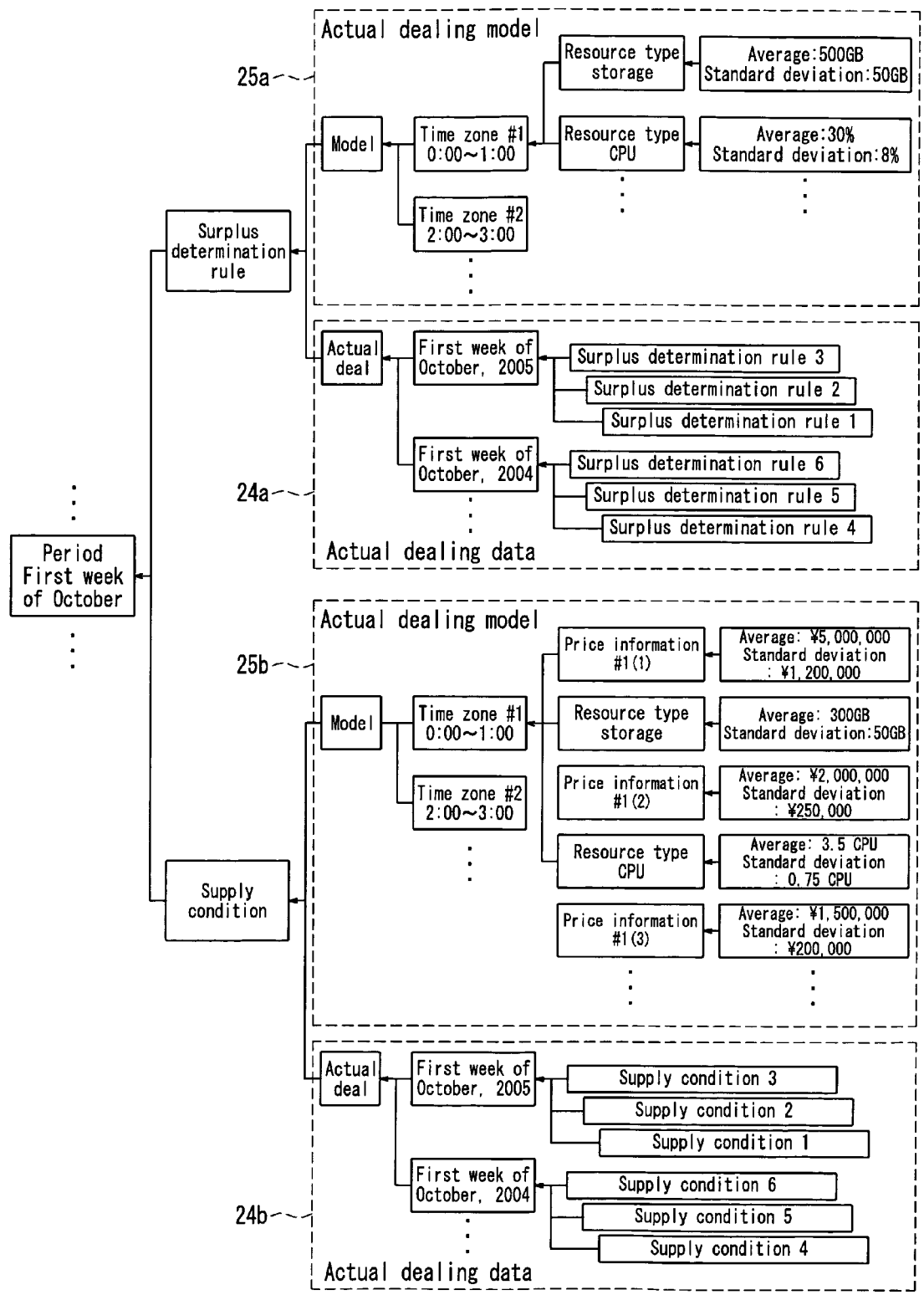
FIG. 14 shows exemplary data configurations of actual dealing data and an actual dealing model.

FIG. 14 shows exemplary data configurations of the actual dealing data 24 and the actual dealing model 25. For example, the actual dealing data 24 and the actual dealing model 25 are summarized to be accumulated for each week. FIG. 14 shows an example representing an actual dealing model 25*b* and actual dealing data 24*b* under a supply condition during the first period in October, and an actual dealing model 25*a* and actual dealing data 24*a* of a surplus determination rule during the first period in October.

The actual dealing data 24*a* of the surplus determination rule has, for example, a configuration in which a surplus determination rule during a corresponding period of each year is accumulated for each year. In the example shown in FIG. 14, the surplus determination rule corresponding to the supply condition approved in the first week of October of each year is accumulated for each year.

The actual dealing model 25*a* of the surplus determination rule has a configuration in which data is accumulated under the condition of being classified for each time zone targeted for determination of a surplus determination rule. In each time zone, for example, an average and a standard deviation are accumulated further for each resource type. The resource type is information for specifying the kind of an IT resource. Examples of the resource type include a storage and a CPU. In place of the resource type, information specifying the type of the working amount of an IT resource, such as a storage capacity, a CPU use ratio, the number of processable transactions, and the amount of transfer data may be used.

The average provided for each resource type in the actual dealing model 25*a* is an average of the working amounts of IT resources represented by a surplus determination rule in that time zone. In addition to the average, general statistical indexes, such as a median of the working amount represented by the surplus determination rule in that time zone, and a mode at which the appearance frequency is highest, can be accumulated. Furthermore, in place of the average, representative values such as a median and a mode can also be accumulated.

The standard deviation provided for each resource type in the actual dealing model 25*a* is a standard deviation of the working amount of an IT resource represented by a surplus determination rule in that time zone. In addition to the standard deviation, for example, a value representing a dispersion of data such as a deviation and a variance can be accumulated further. Furthermore, in place of the standard deviation, a value representing a dispersion of data such as a deviation and a variance can be accumulated.

For example, FIG. 14 shows that an average of storage capacities for a surplus to be determined is 500 GB in a plurality of surplus determination rules under which a time zone #1 (0:00 to 1:00) is targeted for determination. The standard deviation 50 GB is, for example, a value calculated based on an average of storage capacities set as a requirement in a surplus determination rule for one year.

The actual dealing data 24*b* of a supply condition has a configuration, for example, in which a supply condition is accumulated for each corresponding period of each year. In the example shown in FIG. 14, a supply condition approved in the first week of October of each year is accumulated for each year.

The actual dealing model 25b of a supply condition has a configuration in which data is classified to be accumulated for each time zone. In the respective time zones #1, #2, in addition to the price information #1(1) for each time zone, an average and a standard deviation of a supply amount of an IT resource are accumulated for each resource type. Price information #1(2), #1(3) for each resource type also is accumulated so as to correspond to each resource type. The price information #1(1) for each time zone is an average of supply prices of all the resource types supplied in that time zone #1. The price information #1(2), #1(3) for each resource type is an average of supply prices for each resource type.

In the same way as in the actual dealing model 25a of a surplus determination rule, in addition to an average or in place of an average, representative values such as a median and a mode can be accumulated in the actual dealing model 25b. For example, by accumulating a mode of price information, the supply price that is most frequently approved is accumulated. Furthermore, in addition to the standard deviation or in place of the standard deviation, a value presenting a dispersion such as a deviation and a variance can be accumulated.

The configurations of the actual dealing model 25 and the actual dealing data 24 shown in FIG. 14 are merely illustrative, and the present invention is not limited thereto. For example, although the actual dealing model 25 and the actual dealing data 24 are accumulated for each predetermined period (for each week in the example shown in FIG. 14), they may be accumulated for each business category.

The evaluating part 21 refers to the actual dealing model 25, and calculates value data of an IT resource represented by a supply condition and a surplus determination rule targeted for evaluation. The evaluating part 21 extracts a period targeted for determination by a surplus determination rule, i.e., a rule application period from a surplus determination rule targeted for evaluation. The evaluating part 21 compares the rule application period with the transition (for example, see FIG. 13A) of a demand of an IT resource represented by the supply-and-demand data 23, and determines whether or not the rule application period is a peak period (Operation 34 in FIG. 12).

In the case where the rule application period is a peak period (YES in Operation 34), the evaluating part 21 calculates a price estimated to be higher than an average supply price as an evaluation result (Operation 35). Herein, as the average supply price, an average price described in the supply condition during a corresponding period in the actual dealing model 25 is used. For example, in the case where the supply condition targeted for evaluation has the contents that "a storage of 300 GB can be supplied from 0:00 to 1:00", the corresponding data of the actual dealing model 25b shown in FIG. 14 is data of a resource type=storage accumulated in a lower level of the time zone #1. "0:00 to 1:00". The price information #1(2) corresponding to this data is "average: ¥2,000,000". In this case, the evaluating part 21 sets the average supply price to be ¥2,000,000, and calculates a price estimated to be higher than that average supply price as value data of an evaluation result.

As an example of a method for calculating a price estimated to be higher than an average supply price, there is a method for adding a price of a predetermined ratio (e.g., a fixed ratio of 10% or the like) of an average supply price to the average supply price. Furthermore, a predetermined price (e.g., a fixed price such as ¥100,000) can be added to the average supply price. Alternatively, the adding price can also be determined based on the ratio of a "demand of an IT resource in a selling period" with respect to a "demand of an IT resource in an off-peak period". For example, the following methods can be considered: "an average supply price is doubled if the demand of an IT resource during a selling period is twice that during an off-peak period", "N×¥100,000 is added to the average supply price if the demand of an IT resource during a selling period is N times that during an off-period", and the like. The demand of an IT resource during a selling period can be seen, for example, from the supply-and-demand data 23. Thus, by taking the supply-and-demand balance into consideration, the adding price can be determined appropriately.

In the case where the rule application period is not a peak period (NO in Operation 34), the evaluating part 21 compares the rule application period with the transition for example, see FIG. 13B) of a supply of an IT resource represented by the supply-and-demand data 23, thereby determining whether or not the rule application period is an excess period (Operation 36). In the case where the rule application period is an excess period (YES in Operation 36), the evaluating part 21 calculates a price lower than an average supply price as price data of an evaluation result (Operation 37). In the case where the rule application period is not an excess period (NO in Operation 36), the evaluating part 21 calculates a price substantially equal to an average supply price as value data of an evaluation result (Operation 38).

The supply of an IT resource during a peak period should be appreciated in order to keep an entire supply-and-demand balance. The evaluating part 21 estimates the supply price during a peak period to be higher, a premium can be added.

As described above, regarding an IT resource represented by a surplus determination rule and a supply condition set respectively in business systems operated by the individual corporations A, B, and C, the evaluating part 21 can evaluate an IT resource price as an appropriate market value, considering the supply-and-demand balance of the entire IDC 1. Owing to the function of assessing an IT resource represented by a surplus determination rule and a supply condition by the evaluating part 21, the respective corporations A, B, and C can previously estimate an IT resource to be supplied. Consequently, the respective corporations A, B, and C can attempt to utilize a surplus resource at a price higher than the conventional price.

Furthermore, the IT resource evaluation system 20 has a function of presenting the value of an IT resource, whereby the supply of an surplus IT resource by the corporations A, B, and C can be activated. As a result, the retention amount of the IDC owning IT resource 6 to be provided in the IDC 1 can be suppressed.

The exemplary processing in which the evaluating part 21 calculates value data has been described above. In the above example, the evaluating part 21 sets the average supply price obtained based on the actual value of a supply price as a standard value, and calculates value data by the processing of adjusting the standard price in accordance with the transition of the demand and the supply of an IT resource. The method for the evaluating part 21 to calculate value data is not limited thereto.

(Actual Dealing Model Generation Processing)

Herein, the processing in which the model generating part 26 generates the actual dealing model 25 will be described. The contents of the actual dealing model 25 are generated, for example, when the actual dealing model 25 is updated every time the supply condition supplied to the IT resource management system 10 is approved.

Figure 15A:
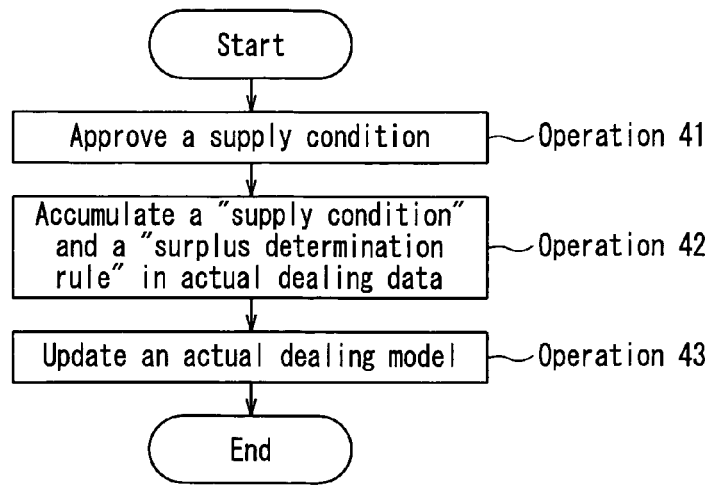
FIG. 15A is a flow chart illustrating an example of a schematic flow of processing until the actual dealing model is updated.

FIG. 15A is a flow chart showing an exemplary schematic flow of processing until the actual dealing model 25 is updated. When the supply conditions presented to the IT resource management system 10 are approved (Operation 41). The IT resource management system 10 accumulates the supply conditions and surplus determination rules corresponding to the supply conditions in the actual dealing data 24 (Operation 42). The IT resource management system 10 organizes the supply conditions and surplus determination rules, for example, for each approval period of the supply conditions, and accumulates them in the actual dealing data 24.

An example will be described in which, in the case where the approval date of the supply condition is Oct. 1, 2005, the supply condition and a surplus determination rule corresponding thereto are accumulated in the actual dealing data 24b shown in FIG. 14. The approval period of the supply condition is the first week of October, 2005, so that the supply condition is accumulated immediately under the "first week of October, 2005" of the actual dealing data 24b shown in FIG. 14. The surplus determination rule corresponding to the supply condition is similarly accumulated immediately under the "first week of October, 2005" of the actual dealing data 24a.

When the supply condition and the surplus determination rule are accumulated in the actual dealing data 24, the model generating part 26 updates the actual dealing model 25 based on these newly accumulated supply condition and surplus determination rule (Operation 43).

Figure 15B:
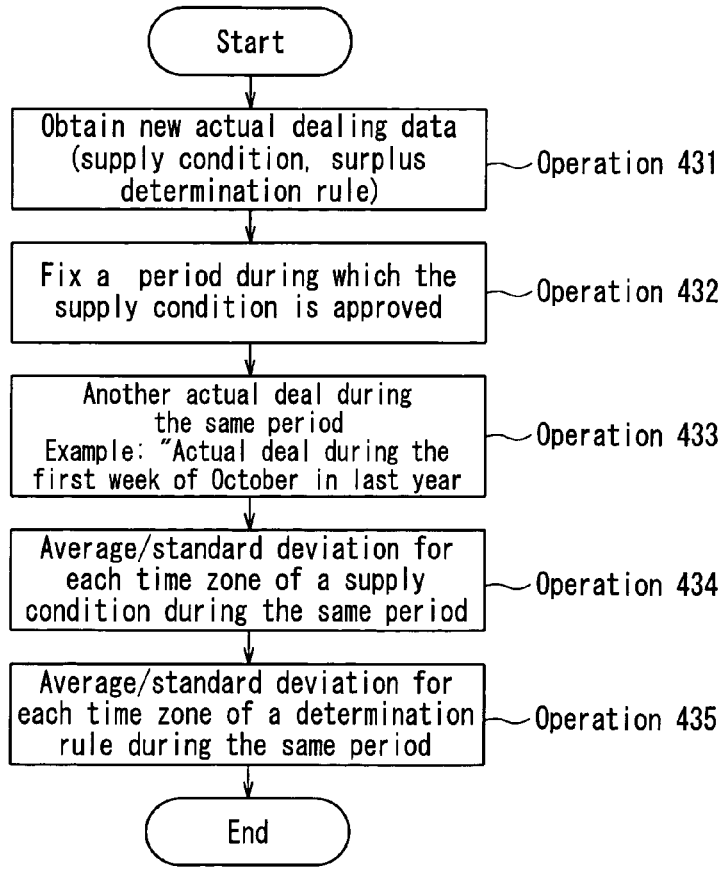
FIG. 15B is a flow chart illustrating an exemplary flow of processing in which a model generating part updates the actual dealing model.

FIG. 15B is a flow chart showing an exemplary flow of processing in which the model generating part 26 updates the actual dealing model 25. The model generating part 26 first obtains the newly accumulated supply condition and surplus determination rule (Operation 431). The model generating part 26 fixes an approval period of the newly accumulated supply condition based on the actual dealing data 24 (Operation 432). In the example in which the supply condition is accumulated in the actual dealing data 24b shown in FIG. 14, the approval period is the "first week of October, 2005".

When the approval period is fixed, the model generating part 26 obtains another actual dealing data during the same period as that of the approval period (Operation 433). The same period as that of the approval period also includes a corresponding period in past years. For example, in the case where the approval period is the "first week of October, 2005", for example, the supply conditions approved in the first weeks of October, 2004 and 2003, and the surplus determination rules corresponding thereto are obtained.

The model generating part 26 obtains, based on another actual dealing data during the same period as the approval period, an average and a standard deviation of the amount of a suppliable IT resource represented by the supply condition approved during that period, and an average and a standard deviation of the supply price represented by the supply condition approved during that period (Operation 434). For example, an average and a standard deviation of the storage capacity supplied during the first week of October, and an average and a standard deviation of the supply price are obtained for each time zone. The mode generating part 26 updates the actual dealing model 25b with the average and the standard deviation obtained in Operation 434.

In the same way as the above, the model generating part 26 obtains an average and a standard deviation of the working situation of an IT resource represented by the surplus determination rule corresponding to the supply condition during the period (Operation 435). Even in the case where the model generating part 26 obtains these average and standard deviation, another actual dealing data during the same period as the approval period, obtained in Operation 433, is used. The model generating part 26 updates the actual dealing model 25a with the average and the standard deviation obtained in Operation 435.

The model generating part 26 performs the above processing (Operations 431 to 435) every time a supply condition is approved, thereby reflecting the actual dealing data 24 of the approved supply condition and surplus determination rule onto the actual dealing model 25. Consequently, the actual dealing model 25 becomes data that reflects the actually approved supply condition.

(Surplus Determination Rule Generation Processing)

Figure 16:
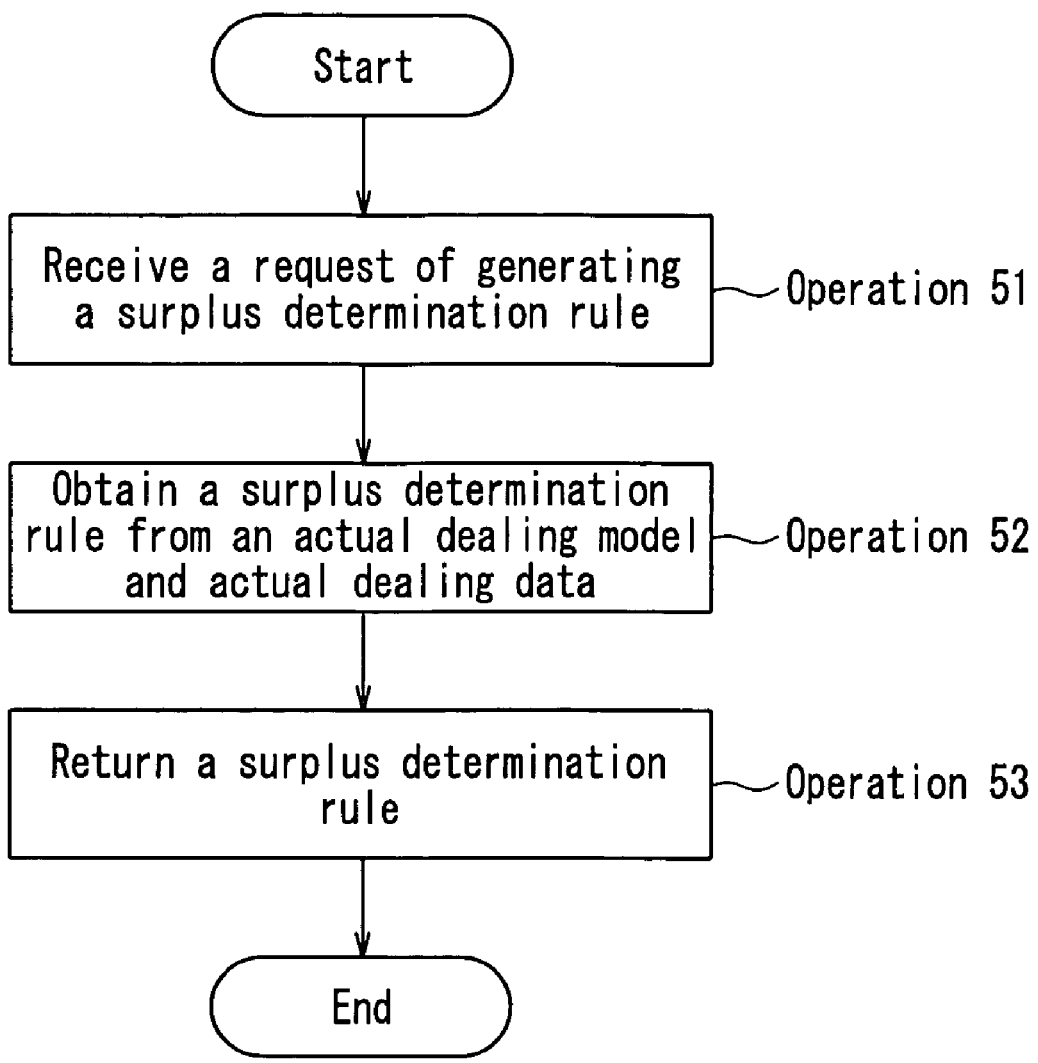
FIG. 16 is a flow chart illustrating an exemplary flow of processing in which the rule generating part generates a surplus determination rule.

Next, the processing in which the rule generating part 18 generates a surplus determination rule will be described. FIG. 16 is a flow chart showing an exemplary flow of processing in which the rule generating part 18 generates a surplus determination rule.

As an example, the case where the corporation A inputs an instruction of generating a surplus determination rule with respect to the RC 7a will be described. The RC 7a transmits a request of generating a surplus determination rule to the input/output part 22 of the IT resource evaluation system 20. The input/output part 22 receives a request of generating a surplus determination rule from the RC 7a, and gives it to the rule generating part 18 (Operation 51). The request of generating a surplus determination rule includes, for example, data representing the business category of a business system which the corporation A operates using the IT resource 7, the resource type of an IT resource, and the period targeted for determination.

The rule generating part 18 having received a request of generation refers to the actual dealing model 25 and the actual dealing data 24, and obtains a surplus determination rule in accordance with the request of generation (Operation 52). The detail of the processing in Operation 52 will be described later.

The rule generating part 18 returns the surplus determination rule obtained in Operation 52 to the RC 7a via the input/output part 22 (Operation 53). Owing to the above processing, the rule generating part 18 can generate a surplus determination rule in accordance with the request of generation from the RC7a.

An example of the processing in Operation 52 will be described. Herein, as an example, the case will be described where the data included in a request of generation includes at least one of "business category", "resource type of an IT resource", and "period targeted for determination". Herein, it is assumed that the "period includes, for example, two times: "use start time" and "use end time".

First, the case where the data contained in a request of generation includes "business category", "resource type of an IT resource", and "period targeted for determination" will be described. More specifically, the case where a business category, a resource type, and a period are specified by a request of generation will be described. FIG. 17A is a flow chart showing an example of processing in Operation 52 in the case where the above-mentioned business category, resource type, and period are specified by a request of generation.

As shown in FIG. 17A, the rule generating part 18 obtains, as a search key, data representing a business category, a resource type of an IT resource, and a period targeted for determination, in accordance with the request of generation given in Operation 51 (Operation 521a). The rule generating part 18 refers to the actual dealing data 24, and extracts all the surplus determination rules that hit the search key (i.e., the business category, the resource type, and the period) from the actual dealing data 24 (Operation 522a). It is preferable that the rule generating part 18 obtains, for example, data representing the actual supply price of an IT resource related to the extracted surplus determination rule, from the actual dealing data 24.

The rule generating part 18 calculates an average price and an average resource amount, based on the surplus determination rule and the actual supply price obtained in Operation 522a (Operation 523a). The average price is, for example, an average of supply prices of all the IT resources specified by the business category, resource type, and period included in the request of generation. The rule generating part 18 may obtain an average price considering a supply-and-demand balance, for example, using the supply-and-demand data 23 or the like, when obtaining an average of supply prices.

The average resource amount is, for example, an average of values representing amounts of respective IT resources in all the IT resources specified by the business category, resource type, and period included in the request of generation.

The rule generating part 18 generates a surplus determination rule that sets the average price and the average resource amount calculated in Operation 523a, and the resource type specified by the request of generation and the period targeted for determination (Operation 524a). Thus, the surplus determination rule is generated in accordance with the request of generation.

In the example of the processing shown in FIG. 17A, the rule generating part 18 obtains an average price and an average resource amount based on the surplus determination rule extracted from the actual dealing data 24. The method for obtaining an average price and an average resource amount is not limited thereto. For example, the average price and the average resource amount accumulated in the actual dealing model 25 can be extracted using the above-mentioned business category, resource type, and period as a search key.

Next, the case where the "business category" and the "resource type of an IT resource" are specified by the request of generation will be described. FIG. 17B is a flow chart showing an example of processing in Operation 52 in the case where the above-mentioned business category and resource type are specified by the request of generation. The rule generating part 18 uses a business category and a resource type as a search key (Operation 521b), and extracts a surplus determination rule matched with the search key from the actual dealing data 24 (Operation 522b). The rule generating part 18 obtains an actual supply price corresponding to the extracted surplus determination rule from the actual dealing data 24.

The rule generating part 18 calculates an average price, an average resource amount, and an average use period, based on the surplus determination rule and the actual supply price obtained in Operation 522b (Operation 523b). Herein, the "average use period" can be, for example, data containing two time averages: "average of user start periods" and "average of use end periods".

The rule generating part 18 generates a surplus determination rule that sets the average price, average resource amount, and average use period calculated in Operation 523b, and the resource type specified by data contained in the request of generation (Operation 524b).

Furthermore, the case where only the "business category" is specified by a request of generation will be described. FIG. 17C is a flow chart showing an example of processing in Operation 52 in the case where a business category is specified by a request of generation. The rule generating part 18 uses the business category as a search key (Operation 521c), and extracts a surplus determination rule matched with the search key from the actual dealing data 24 (Operation 522c). The rule generating part 18 also obtains an actual supply price corresponding to the extracted surplus determination rule from the actual dealing data 24.

The rule generating part 18 calculates an average price, an average resource amount, and an average use period for each resource type, based on the surplus determination rule and the supply actual price obtained in Operation 522c (Operation 523c).

The rule generating part 18 generates a surplus determination rule that sets an average price, an average resource amount, and an average use period for each resource type calculated in Operation 523c (Operation 524c).

As described above, in the case where the information other than the business category is undetermined, for example, when a period targeted for determination is not specified, as in the example shown in FIG. 17B, the rule generating part 18 can generate an average of periods targeted for determination. Furthermore, for example, in the case where the resource type is not specified, the rule generating part 18 can generate an average of periods, prices, and resource amounts with respect to the respective resources, as in the example shown in FIG. 17C.

Figure 17:
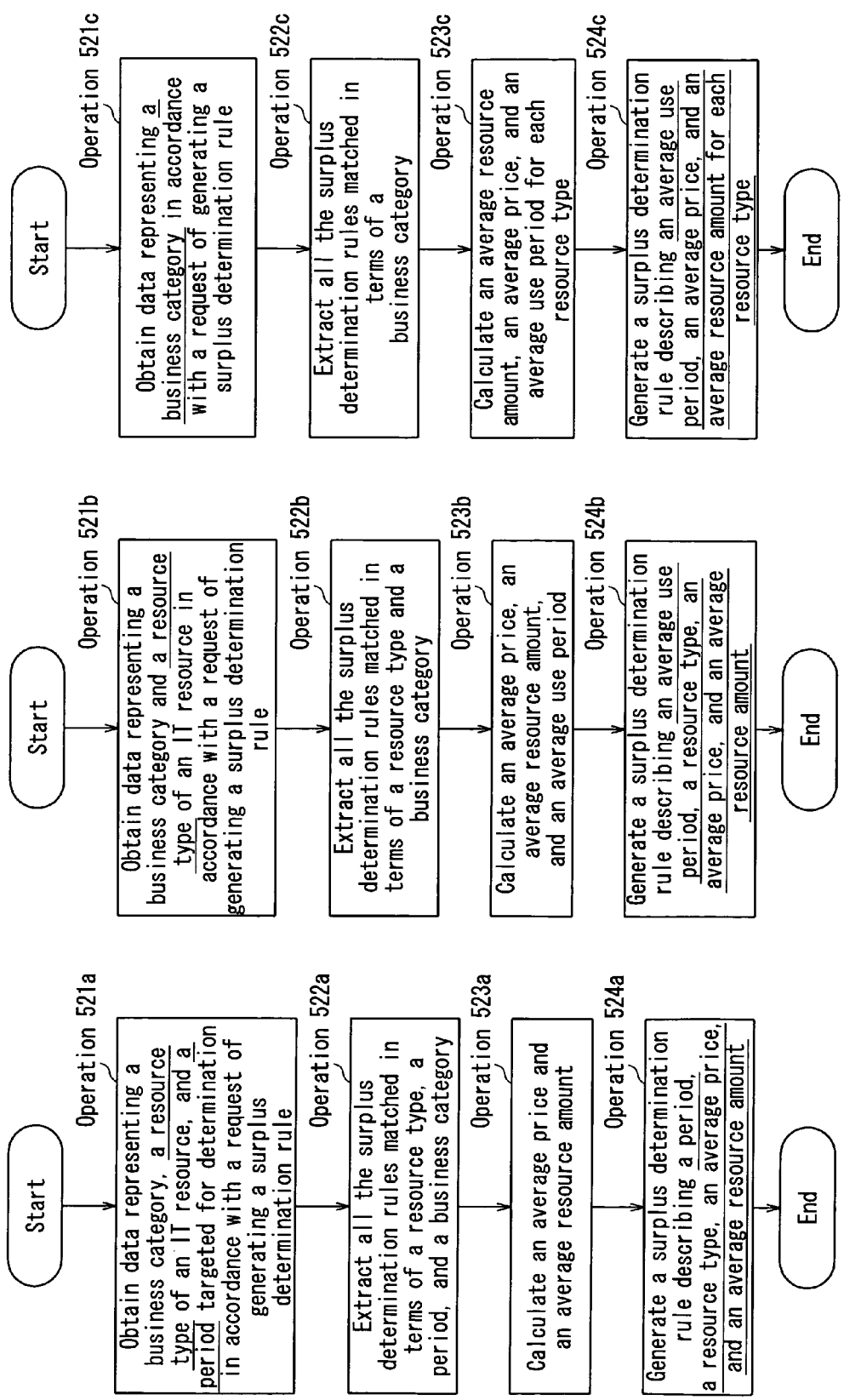
FIG. 17A is a flow chart showing an example of processing of obtaining a surplus determination rule in the case where a business category, a resource type and a period are specified.
FIG. 17B is a flow chart illustrating an example of processing of obtaining a surplus determination rule in the case where a business category and a resource type are specified.
FIG. 17C is a flow chart illustrating an example of processing of obtaining a surplus determination rule in the case where a business category is specified.

In the example shown in FIG. 17, although an average such as an average price, an average resource, or an average use period is generated, data to be generated is not limited to the average. For example, statistical representative values such as a mode and a median may be generated.

Owing to the above processing, the rule generating part 18 can generate a surplus determination rule in accordance with the request of generation from the RC7a. The rule generating part 18 generates a surplus determination rule based on the actual dealing model 25. The actual dealing model 25 is data on which the operating situations of all the IT resources managed by the IT resource management system are reflected. Consequently, a surplus determination rule having an appropriate value can be provided, considering the operating situations of all the IT resources managed by the IT resource management system 10.

Furthermore, the corporations A, B, and C adopt the surplus determination rules generated by the rule generating part 18, thereby contributing to the optimization of a supply-and-demand balance of the entire IDC 1. Therefore, for example, in the case where the rule generating part 18 compares the generated surplus determination rule with the surplus determination rule set by each of the respective corporations A, B, and C, and both the rules are close to each other, the evaluating part 21 may perform an evaluation of estimating a supply condition to be higher.

(Supply Condition Generation Processing)

Next, the processing in which the supply condition generating part 19 adds value data to a supply condition with a price undetermined will be described.

Figure 18:
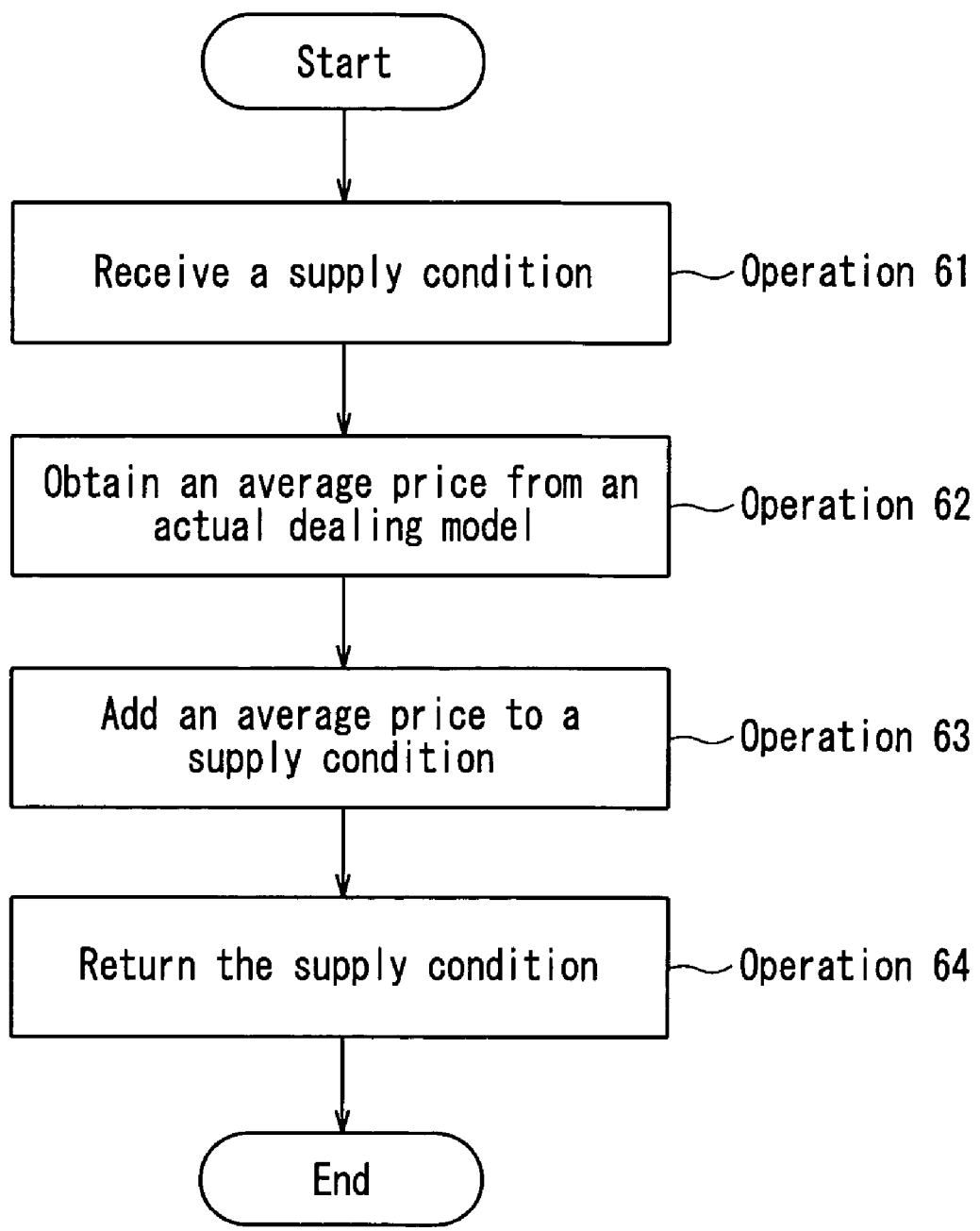
FIG. 18 is a flow chart illustrating an exemplary flow of processing in which a supply condition generating part adds value data to a supply condition with a price undetermined.

FIG. 18 is a flow chart showing an exemplary flow of processing in which the supply condition generating part 19 adds value data to a supply condition with a price undetermined.

For example, in the case where the corporation A sets a supply condition of the IT resource 7, and only a supply price is not determined, the corporation A can input an instruction of automatically setting a supply price in the RC 7a. When receiving an instruction of automatically setting a supply price, the RC 7a transmits a supply condition with a supply price undetermined to the IT resource evaluation system 20.

Figure 19:
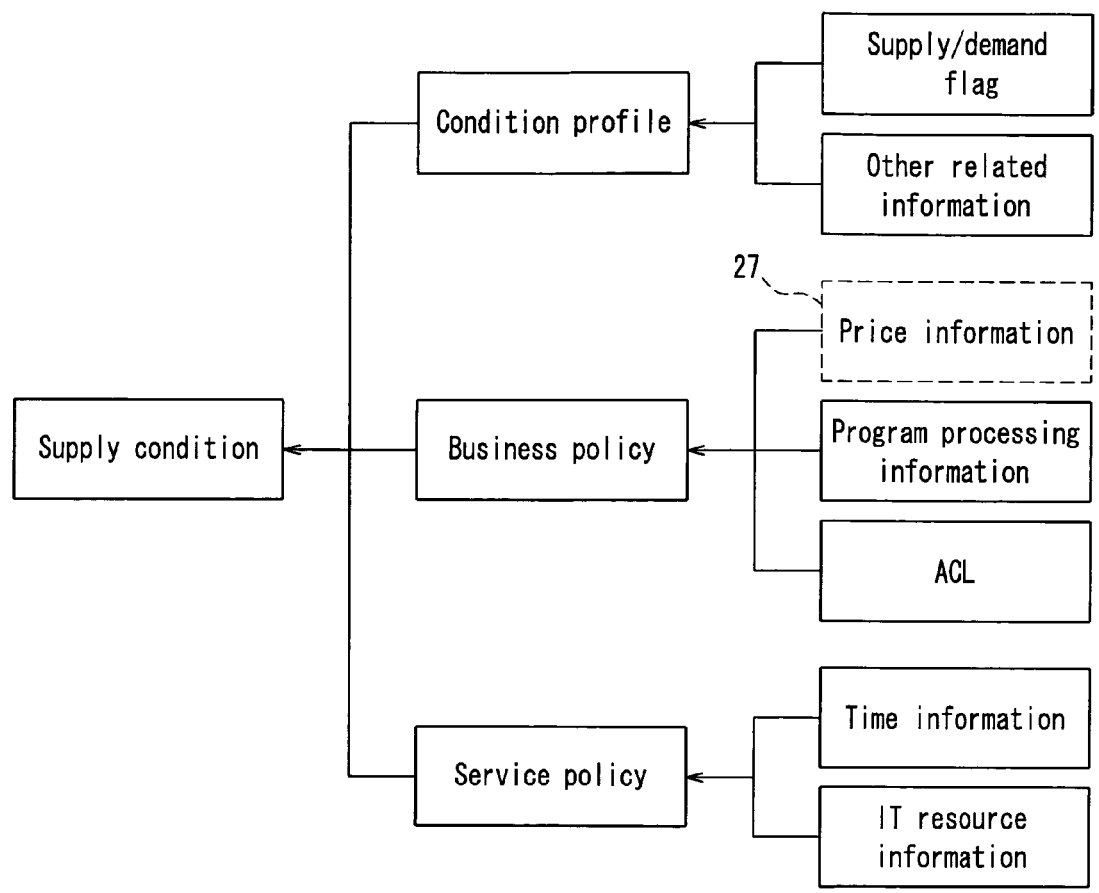
FIG. 19 conceptually shows an example in the case where price information is not set under a supply condition.

The input/output part 22 receives the supply condition with a supply price undetermined from the RC7a. FIG. 19 schematically shows an exemplary case where price information is undetermined under the supply condition. In the supply condition shown in FIG. 19, the price information 27 showing a supply price is not set.

When receiving the supply condition with a supply price undetermined, the input/output part 22 gives the supply condition to the evaluating part 21 (Operation 61). The evaluating part 21 refers to the actual dealing model 25 based on the time information and the IT resource information included in a service policy described under the received supply condition, and obtains an average of the corresponding supply price (Operation 62). For example, the case will be described where the time information of the supply condition received by the evaluating part 21 represents "0:00 to 1:00", and the IT resource information represents "a storage of 300 KG can be supplied". In this case, assuming that the actual dealing model 25b shown in FIG. 14 is used, the evaluating part 21 obtains price information "¥2,000,000" corresponding to the resource type "storage" in a time zone #1 "0:00 to 1:00". More specifically, the evaluating part 21 calculates value data of a value "¥2,000,000" as a supply price of an IT resource represented by the received supply condition.

The supply condition generating part 19 adds the value data calculated by the evaluating part 21, i.e., the supply price to the supply condition (Operation 63). The supply condition generating part 19 updates, for example, the value information of the supply condition to "¥2,000,000". The supply condition with the supply price thus added is returned to the RC 7a via the input/output part 22. Consequently, the corporation A can obtain an appropriate price based on the actual price in the entire IDC 1 as a price of a supply condition.

The present invention is useful, for example, as an IT resource evaluation system capable of enhancing the use ratio of an IT resource in an IDC or the like.

The present invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A server comprising:
an IT resource evaluation system for evaluating a value of an IT resource with at least one of a plurality of business systems constituted with a computer operated independently from each other being targeted for evaluation, connected to a management system constituted with a computer having a mechanism of managing a plurality of IT resources working respectively in the plurality of business systems, and supplying a surplus of the IT resource in any one of the plurality of business systems to another business system demanding the IT resource on a chargeable basis, the IT resource evaluation system comprising:
a supply-and-demand data recording part for recording supply-and-demand data representing a transition of at least either one of a demand and a supply of the IT resource in all the plurality of business systems;
an actual dealing data recording part for recording actual dealing data in which an actual supply price of the surplus of the IT resource that is actually supplied from any one of the business systems to another business system, an amount of the supplied surplus, and a first surplus determination rule for determining the supplied surplus are correlated with one another and accumulated;
an IT resource data input part for inputting, by the server, IT resource data containing a second surplus determination rule that is data representing at least a working situation of an IT resource as a requirement for determining a presence/absence of a surplus of the IT resource in the business system targeted for evaluation and the period targeted for determination, from the business system targeted for evaluation; and
an evaluating part for determining whether a period targeted for the determination represented by the second surplus determination rule of the IT resource data is a peak period or an excess supply period based on at least one transition of the demand and the supply represented by the supply-and-demand data, specifying the first surplus determination rule which corresponds to the second surplus determination rule, and calculating, by the server, a supply price higher than the actual supply price correlated with the specified first surplus determination rule of the actual dealing data in a case where the period targeted for the determination is the peak period and a supply price lower than the actual supply price in a case where the period targeted for the determination is the excess supply period,
wherein said accumulation comprises accumulating supply conditions and demand conditions.

2. The server comprising an IT resource evaluation system according to claim 1, wherein the actual dealing data contains an average, a mode, or a median of the actual supply price, and an average, a mode, or a median of the amount of the supplied IT resource.

3. The server comprising an IT resource evaluation system according to claim 1, wherein the IT resource data contains the second surplus determination rule that is data representing at least the working situation of the IT resource as the requirement for determining a presence/absence of a surplus of the IT resource in the business system and the period targeted for determination.

4. The server comprising an IT resource evaluation system according to claim 1, further comprising a supply condition data generating part for adding the supply price calculated by the evaluating part to the IT resource data, thereby generating supply condition data representing a supply condition for supplying the IT resource.

5. The server comprising an IT resource evaluation system according to claim 1, wherein the first surplus determination rule, which is data used for determining that there is a surplus in the IT resource when the surplus of the IT resource in any one of the plurality of business systems is supplied to another business system and which represents a working situation of the IT resource as a requirement for determining a presence/absence of the surplus of the IT resource and a period targeted for determination, is contained in the actual dealing data to be recorded in the actual dealing data recording part,
the IT resource evaluation system further comprising a rule generating part for generating the second surplus determination rule for at least one of the plurality of business systems, based on the first surplus determination rule contained in the actual dealing data.

6. The server comprising an IT resource evaluation system of claim 1, further comprising:
a supply condition accumulating part for accumulating, by the server supply condition data for the business system having the surplus of an IT resource to supply the surplus, which represents at least an amount of the suppliable IT resource and a supply price;
a demand condition accumulating part for accumulating, by the server demand condition data representing at least an amount of an IT resource to be demanded and a demand price that are demand conditions for the business system that lacks an IT resource to compensate for a shortage of the IT resource;

a matching part for extracting, by the server supply condition data and demand condition data that are matched with each other, from the supply condition data accumulated in the supply condition accumulating part and the demand condition data accumulated in the demand condition accumulating part;

an assigning part for setting, by the server a suppliable IT resource represented by the supply condition data extracted by the matching part so as to be in a state workable by a business system related to the demand condition data extracted by the matching part; and an actual dealing data generating part for recording, by the server the supply condition data extracted by the matching part in the actual dealing data recording part of the IT resource evaluation system as the actual dealing data.

7. A non-transitory computer-readable storage medium storing an IT resource evaluation program for allowing a computer to execute processing of evaluating a value of an IT resource with at least one of a plurality of business systems operated independently from each other being targeted for an evaluation, the computer being connected to a management system having a mechanism of managing a plurality of IT resources working respectively in the plurality of business systems, and supplying a surplus of an IT resource in any one of the plurality of business systems to another business system demanding the IT resource on a chargeable basis, the IT resource evaluation program allowing the computer to execute:

demand-and-supply data reading processing of reading demand-and-supply data representing a transition of at least either one of a demand and a supply of an IT resource in all the plurality of business systems, from a demand-and-supply data recording part for storing the demand-and-supply data;

actual dealing data reading processing of reading actual dealing data an actual supply price of the surplus of the IT resource that is actually supplied from any one of the business systems to another business system, an amount of the supplied surplus, and a first surplus determination rule for determining the supplied surplus are correlated with one another and accumulated;

IT resource data input processing of inputting, by the computer, IT resource data containing a second surplus determination rule that is data representing at least a working situation of an IT resource as a requirement for determining a presence/absence of a surplus of the IT resource in the business system targeted for evaluation and a period targeted for determination, from the business system targeted for evaluation; and determining whether a period targeted for the determination represented by the second surplus determination rule of the IT resource data is a peak period or an excess supply period based on at least one transition of the demand and the supply represented by the supply-and-demand data, specifying the first surplus determination rule which corresponds to the second surplus determination rule, and calculating, by the computer, a supply price higher than the actual supply price correlated with the specified first surplus determination rule of the actual dealing data in a case where the period targeted for the determination is the peak period and a supply price lower than the actual supply price in a case where the period targeted for the determination is the excess supply period;

wherein said accumulation comprises accumulating supply conditions and demand conditions.

* * * * *